(12) United States Patent
Nishimura et al.

(10) Patent No.: US 9,829,035 B2
(45) Date of Patent: Nov. 28, 2017

(54) BICYCLE CONTROL CABLE

(75) Inventors: Atsuhiro Nishimura, Sakai (JP); Kenji Ose, Sakai (JP); Takamoto Asakawa, Sakai (JP); Osamu Kariyama, Sakai (JP); Yoshimitsu Miki, Sakai (JP); Tooru Iwai, Sakai (JP)

(73) Assignee: Shimano Inc., Osaka (JP)

( * ) Notice: Subject to any disclaimer, the term of this patent is extended or adjusted under 35 U.S.C. 154(b) by 963 days.

(21) Appl. No.: 13/474,025

(22) Filed: May 17, 2012

(65) Prior Publication Data
US 2013/0081509 A1    Apr. 4, 2013

Related U.S. Application Data

(63) Continuation-in-part of application No. 13/248,153, filed on Sep. 29, 2011, now abandoned.

(51) Int. Cl.
*F16C 1/26* (2006.01)
*F16C 1/20* (2006.01)
*B62M 25/02* (2006.01)
*B60T 11/04* (2006.01)
(Continued)

(52) U.S. Cl.
CPC ............ *F16C 1/205* (2013.01); *B60T 11/046* (2013.01); *B62M 25/02* (2013.01); *D07B 5/005* (2013.01);
(Continued)

(58) Field of Classification Search
CPC .... F16C 1/10; F16C 1/20; F16C 1/205; F16C 1/26; F16C 1/267; F16C 1/12
(Continued)

(56) References Cited

U.S. PATENT DOCUMENTS 4,265,140 A    5/1981  Nagano
4,588,461 A *  5/1986  Braun ...................... A61F 2/06
                                                    156/143
(Continued)

FOREIGN PATENT DOCUMENTS

FR    1245753 A  * 11/1960  ................ F16C 1/20
JP    2-91255 U      7/1990
(Continued)

OTHER PUBLICATIONS

Machine translation of FR 1245753, obtained May 29, 2014.*

*Primary Examiner* — Richard W Ridley
*Assistant Examiner* — Brian McGovern
(74) *Attorney, Agent, or Firm* — Global IP Counselors, LLP

(57) ABSTRACT

A bicycle control cable is provided with a central wire, an outer case and a radial protrusion. The central wire includes at least one metallic strand defining a radially outermost surface of the central wire. The outer case surrounds at least a portion of an axial length of the central wire. The outer case has a radially innermost surface. The radial protrusion spirally extends along one of either the radially outermost surface of the central wire or the radially innermost surface of the outer case in a direction intersecting with a center longitudinal axis of the bicycle control cable. The radial protrusion reduces a sliding resistance of the central wire relative to the outer case. The central wire is configured and arranged to slidably move in an axial direction with respect to the center longitudinal axis of the bicycle control cable within the outer case to operate a bicycle component.

20 Claims, 17 Drawing Sheets

(51) Int. Cl.
   *D07B 5/00* (2006.01)
   *B62L 3/02* (2006.01)

(52) U.S. Cl.
   CPC ............ *F16C 1/20* (2013.01); *F16C 1/267* (2013.01); *B62L 3/02* (2013.01); *F16C 2326/20* (2013.01); *F16C 2326/28* (2013.01); *Y10T 74/20456* (2015.01)

(58) Field of Classification Search
   USPC ............ 74/500.5, 502.4–502.6; 57/210, 230
   See application file for complete search history.

(56) References Cited

U.S. PATENT DOCUMENTS

| | | | |
|---|---|---|---|
| 5,245,887 A * | 9/1993 | Tanaka et al. | ............... 74/502.5 |
| 5,353,626 A | 10/1994 | Davidson et al. | |
| 5,636,551 A * | 6/1997 | Davidson et al. | ........... 74/502.5 |
| 7,162,858 B2 | 1/2007 | Graham | |
| 7,559,189 B2 | 7/2009 | Honda et al. | |
| 7,650,814 B2 | 1/2010 | Watarai | |
| 8,696,738 B2 * | 4/2014 | Noesner | ................... A61F 2/07 623/1.32 |
| 2015/0306354 A1 * | 10/2015 | Kanetake | .............. A61M 25/09 604/529 |

FOREIGN PATENT DOCUMENTS

| | | |
|---|---|---|
| JP | 10-159832 A | 6/1998 |
| JP | 11-247078 A | 9/1999 |
| JP | 2000-130427 A | 5/2000 |
| JP | 2001-140848 A | 5/2001 |
| JP | 2006-342917 A | 12/2006 |
| JP | 2008-32063 A | 2/2008 |

* cited by examiner

BICYCLE CONTROL CABLE

CROSS-REFERENCE TO RELATED APPLICATIONS

This application is a continuation-in-part application of U.S. patent application Ser. No. 13/248,153 filed on Sep. 29, 2011. The entire disclosure of U.S. patent application Ser. No. 13/248,153 is hereby incorporated herein by reference.

BACKGROUND

Field of the Invention

This invention generally relates to a bicycle control cable. More specifically, the present invention relates to an inner wire of a bicycle control cable such as a Bowden cable.

Background Information

Bicycles often have components that are manually operated by a bicycle control cable (e.g., a brake cable and a gear shill cable). In particular, the bicycle control cable interconnects a "manually operated part" of bicycle to a "cable operated part" of bicycle. Examples of "manually operated parts" include brake levers and gear shifters. Examples of "cable operated parts" include brake devices and the gear changing devices. Typically, conventional bicycle control cables have, for example, a tubular outer case and an inner wire that can be inserted into and passed through the outer case. This type of bicycle control cable is often called a Bowden type of bicycle control cable. The outer case of a typical Bowden cable has a synthetic resin liner against which the outside surface of the inner wire slides, a flat steel wire wound helically onto the outside circumference of the liner, and a synthetic resin jacket that covers the outside circumference of the flat steel wire. The inner wire of a typical Bowden cable is made of intertwined steel wire. The inner wire protrudes beyond both ends of the outer case and each end of the inner wire is connected to either a manually operated part or a cable-operated part. In some cases, one or each end of the inner wire has an anchor part for attachment to a brake lever, a gear shifter, etc. The anchor part is often fixed to the tip end of the inner wire by crimping or other suitable fastening method. The outer diameter of the inner wire needs to be sufficiently small relative to an internal diameter of the outer case for the inner wire to slide within the outer case. To aid in the sliding of the inner wire within the outer case, a lubricant is sometimes provided between the inner wire and the outer case. However, this lubricant becomes contaminated over time, and thus, regular maintenance is required for smooth operation of the bicycle control cable.

In view of the above, it will be apparent to those skilled in the art from this disclosure that there exists a need for an improved bicycle control cable. This invention addresses this need in the art as well as other needs, which will become apparent to those skilled in the art from this disclosure.

SUMMARY

One aspect presented in the present disclosure is to provide a bicycle control cable that has an improved sliding efficiency of an inner wire.

In view of the state of the known technology, a bicycle control cable is provided with a central wire, an outer case and a radial protrusion. The central wire includes at least one metallic strand defining a radially outermost surface of the central wire. The outer case surrounds at least a portion of an axial length of the central wire. The outer case has a radially innermost surface. The radial protrusion spirally extends along one of either the radially outermost surface of the central wire or the radially innermost surface of the outer case in a direction intersecting with a center longitudinal axis of the bicycle control cable. The radial protrusion reduces a sliding resistance of the central wire relative to the outer case. The central wire is configured and arranged to slidably move in an axial direction with respect to the center longitudinal axis of the bicycle control cable within the outer case to operate a bicycle component.

These and other objects, features, aspects and advantages of the disclosed bicycle control cables will become apparent to those skilled in the art from the following detailed description, which, taken in conjunction with the annexed drawings, discloses several embodiments.

BRIEF DESCRIPTION OF THE DRAWINGS

Referring now to the attached drawings which form a part of this original disclosure:

FIG. 11 is a transverse cross sectional view of a bicycle control cable in accordance with a fourth embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
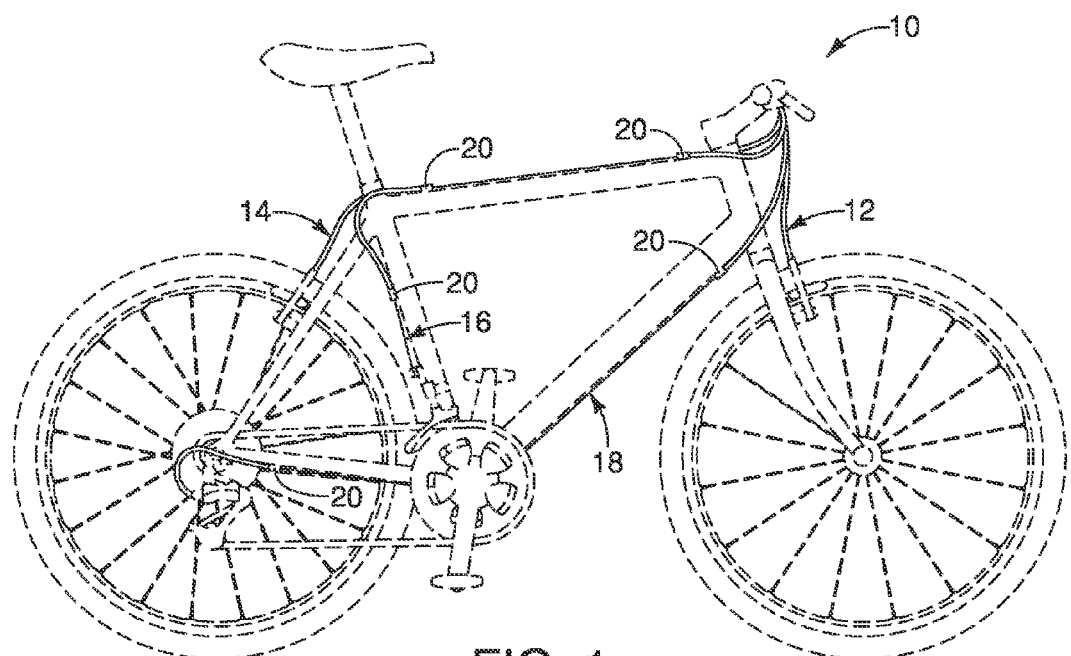
FIG. 1 is a diagrammatic side elevational view of a bicycle equipped with several bicycle control cables in accordance with illustrative embodiments.

Referring initially to FIG. 1, a bicycle 10 is illustrated that is equipped with several bicycle control cables 12, 14, 16 and 18 in accordance with illustrative embodiments as explained below. The bicycle control cable 12 is operatively connected between a front brake lever and a front brake caliper. The bicycle control cable 14 is operatively connected between a rear brake lever and a rear brake caliper. The bicycle control cable 16 is operatively connected between a front shifter and a front derailleur. The bicycle control cable 18 is operatively connected between a rear shifter and a rear derailleur. The bicycle control cables 12, 14, 16 and 18 are mounted to the bicycle 10 via a plurality of cable guides or stops 20.

Turning now to FIGS. 2 to 5, the bicycle control cable 12 will be discussed in more detail. The bicycle control cable 12 basically, includes a central wire 22 and a radial protrusion 24. Preferably, as shown, the radial protrusion 24 and the central wire 22 are attached to each other by thermal melting. In this way, the radial protrusion 24 does not move relative to the central wire 22. The central wire 22 and the radial protrusion 24 form an inner wire. In the case of the bicycle control cable 12, an outer case 26 may be provided over a majority of the central wire 22 and the radial protrusion 24. The inner wire (i.e., the central wire 22 and the radial protrusion 24) slides within the outer case 26. In other words, the central wire 22 and the radial protrusion 24 are configured and arranged to slidably move together in an axial direction with respect to a center longitudinal axis A of the central wire 22 within the outer case 26 to operate a bicycle component (e.g., the front derailleur in FIG. 1). The ends of the inner wire (i.e., the central wire 22 and the radial protrusion 24) protrude beyond both ends of the outer case 26. One end of the central wire 22 is connected to the brake lever (i.e., a manually operated part), while the other end of the central wire 22 is connected to the brake caliper (i.e., a cable-operated part).

The outer case 26 can be any type of outer case that can be used to slidably support the inner wire (i.e., the central wire 22 and the radial protrusion 24). For example, the outer case 26 preferably includes a synthetic resin liner, a flat steel wire wound helically onto an outside circumference of the synthetic resin liner, and a synthetic resin jacket that covers an outside circumference of the flat steel wire. For the sake of illustration, the synthetic resin liner, the flat steel wire and the synthetic resin jacket are illustrated as a solid synthetic resin tube in FIG. 5. The outer case 26 can be a continuous tube that surrounds one portion of an axial length of the central wire 22 and the radial protrusion 24.

Figure 3A:
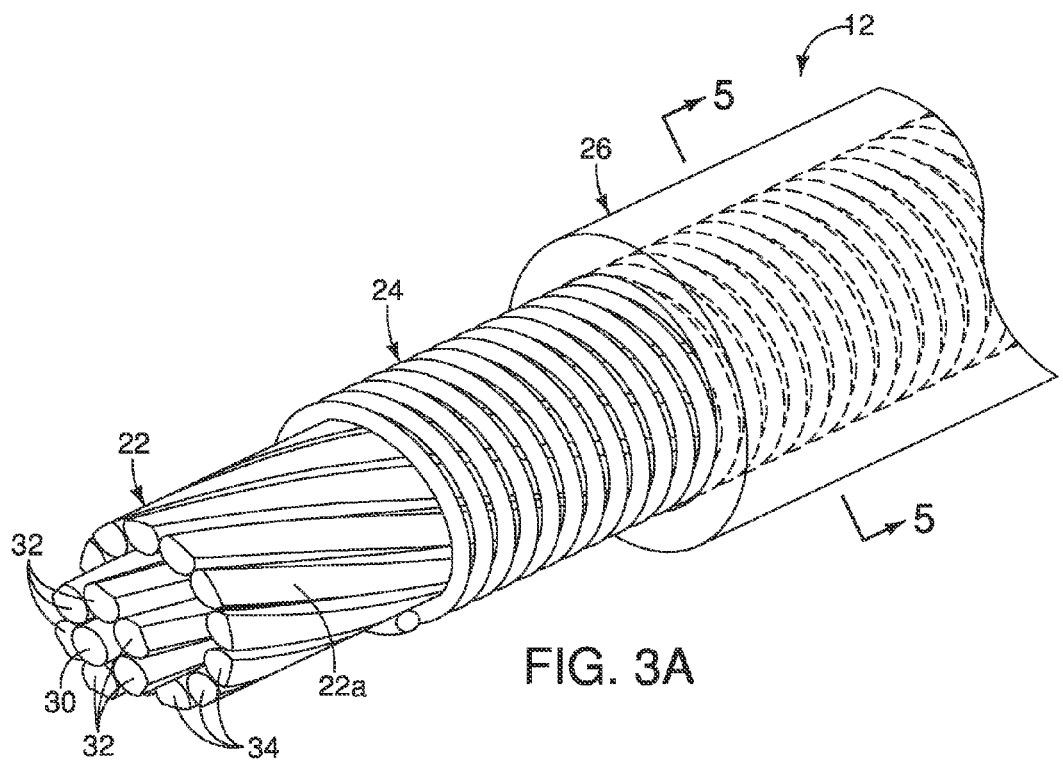
FIG. 3A is an enlarged perspective view of a portion of the bicycle control cable illustrated in FIG. 2 with portions removed for purposes of illustration.
Figure 3B:
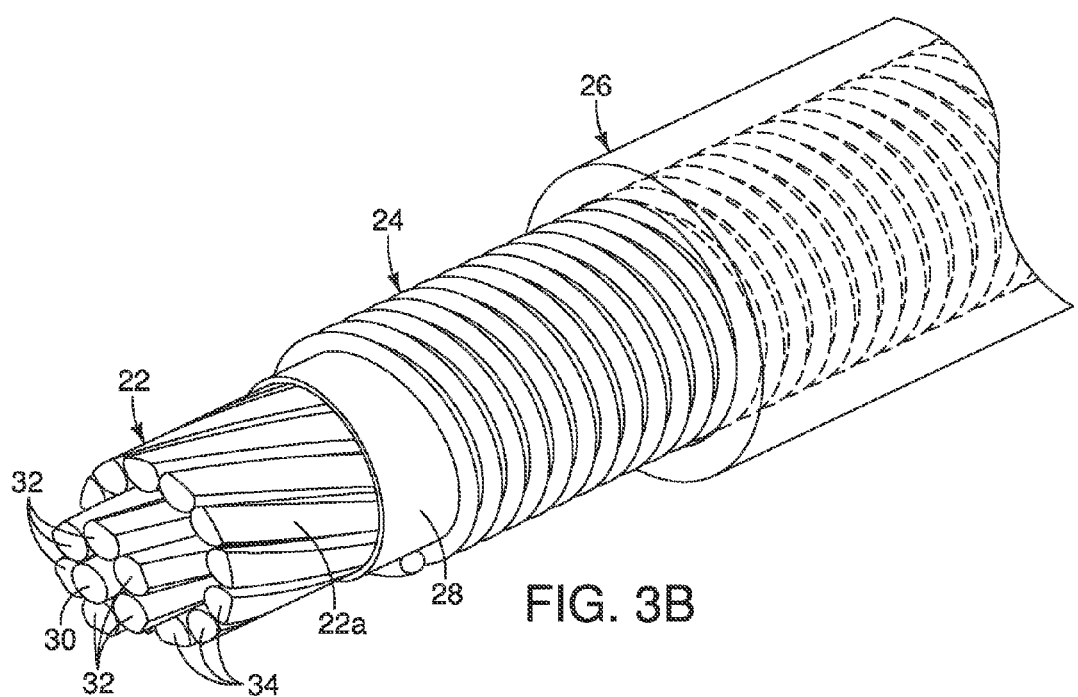
FIG. 3B is an enlarged perspective view of a portion of a modified bicycle control cable in which a primer layer is disposed between the radial protrusion and the central wire to enhance adhesion therebetween.
Figure 5:
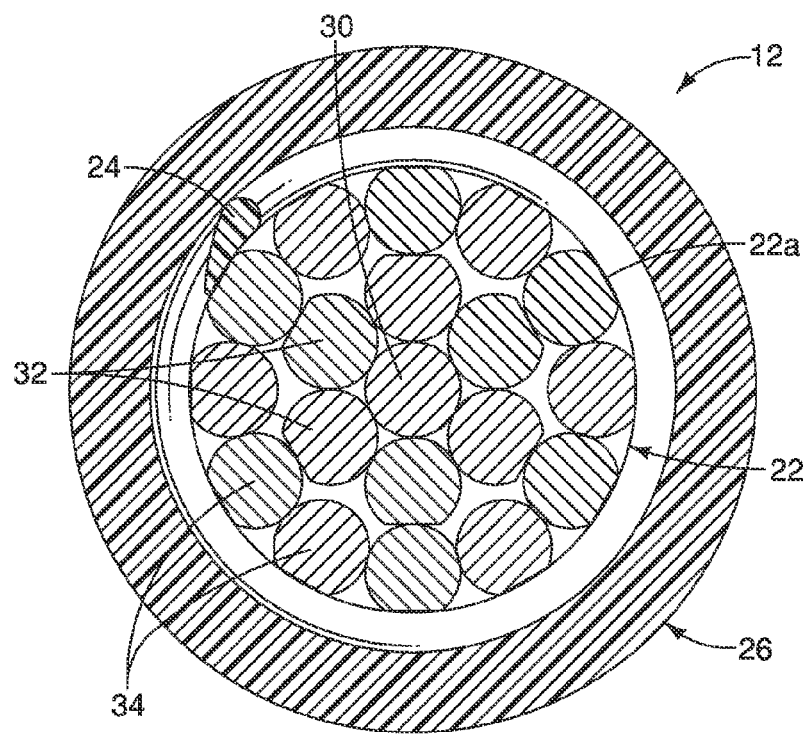
FIG. 5 is a transverse cross sectional view of the bicycle control cable illustrated in FIGS. 2 to 4 as seen along section line 5-5 of FIG. 3.
Figure 6:
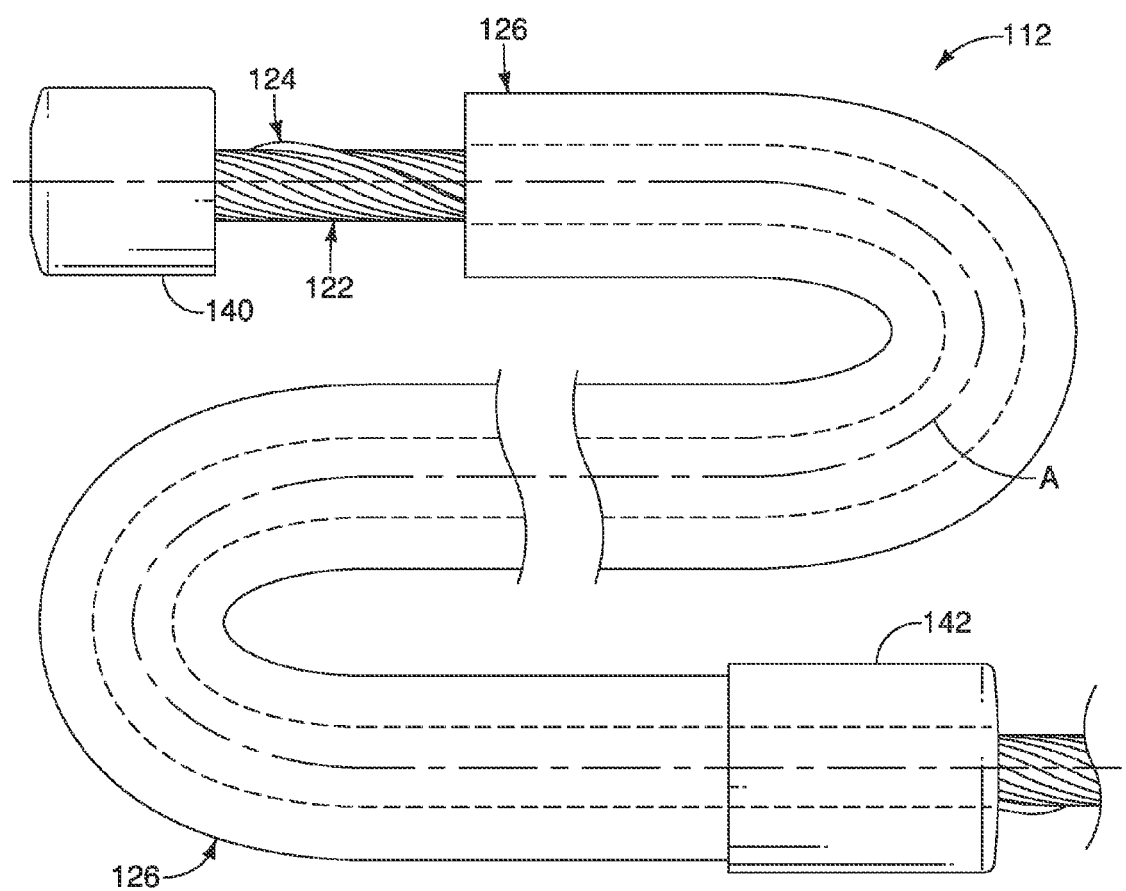
FIG. 6 is a side elevational view of a bicycle control cable illustrated in accordance with a second embodiment.

As best seen in FIGS. 3A, 3B and 5, in the first illustrated embodiment, the central wire 22 includes a center metallic strand 30, a plurality of middle metallic strands 32 and a plurality of outer metallic strands 34. The metallic strands 30, 32 and 34 are helically wound to form a wire with a circular cross section, In the first illustrated embodiment, the central wire 22 has an outermost diameter of about 1.1 millimeters. Alternatively, the central wire 22 can be a single metallic strand, In the first illustrated embodiment, the outer metallic strands 34 define a radially outermost surface 22a of the central wire 22. Thus, in the first illustrated embodiment, the central wire 22 is made of helically wound steel wire strands. Optionally, the radially outermost surface 22a of the central wire 22 is coated by a primer layer 28 as show in FIG. 39 so that the adhesion between the radial protrusion 24 and the central wire 22 is enhanced.

Figure 2:
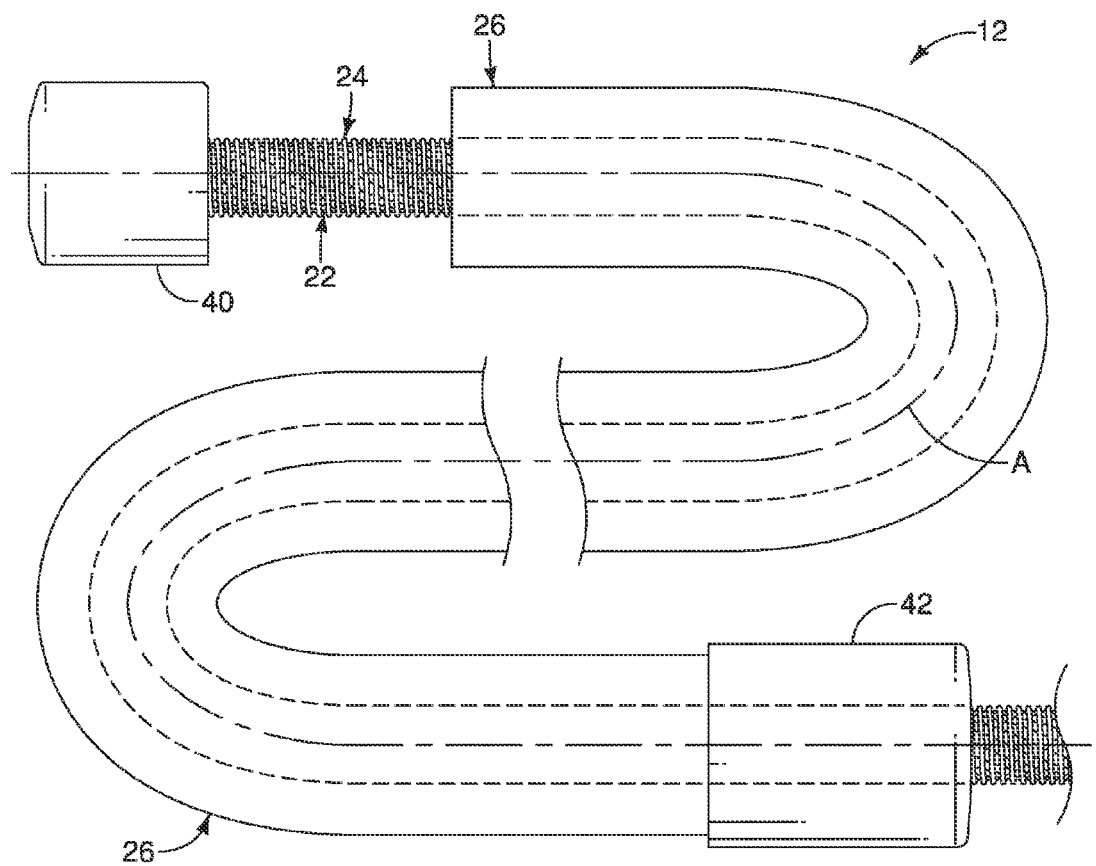
FIG. 2 is a side elevational view of one of the bicycle control cables illustrated in FIG. 1 in accordance with a first embodiment.

As best seen in FIG. 2, in the first illustrated embodiment, the radial protrusion 24 extends along the radially outermost surface 22a in a direction intersecting with a center longitudinal axis A of the central wire 22. As a result, the radial protrusion 24 spaces the radially outermost surface 22a of the central wire 22 from an innermost surface of the outer case 26, In this way, the radial protrusion 24 reduces a sliding resistance of the central wire 22 within the outer case 26, In other words, by providing the radial protrusion 24 on the radially outermost surface 22a of the central wire 22, less contact occurs between the innermost surface of the outer case 26 and the inner wire (i.e., the central wire 22 and the radial protrusion 24), Preferably, as best seen in FIGS. 3A to 5, in the first illustrated embodiment, the radial protrusion 24 includes at least one resin string that is spirally wound around the radially outermost surface 22a of the central wire 22. In the first illustrated embodiment, the string forming the radial protrusion 24 has a circular cross section with a diameter of about 80 micrometers as compared to the diameter of the central wire 22 which is about 1.1 millimeters. As best seen in FIG. 5, the radial protrusion 24 (the at least one resin string) has a diameter that is smaller than the diameters of each of the metallic strands 30, 32 and 34 of the central wire 22.

Figure 4:
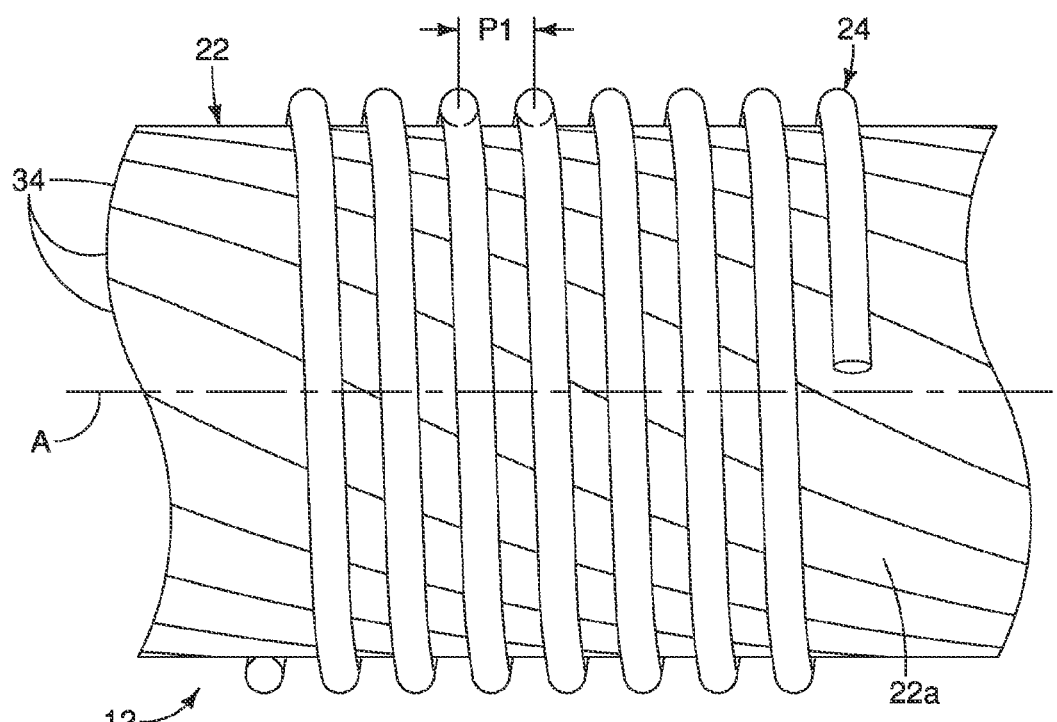
FIG. 4 is an enlarged side elevational view of a portion of the inner wire of the bicycle control cable illustrated in FIGS. 2 and 3.

While the radial protrusion 24 is illustrated as a single resin string, the radial protrusion 24 can have other configurations. For example, the radial protrusion 24 can be made of a plurality of helically wound resin strings. As seen in FIG. 4, the radial protrusion 24 (the at least one resin string) has a pitch PI that is less than or equal to 1 millimeter. Preferably, the pitch P1 of the radial protrusion 24 (the at least one resin string) is less than or equal to 500 micrometers, and more preferably about 150 micrometers as illustrated.

Preferably, the radial protrusion 24 is made of a material that has a lower coefficient of friction than the material of the central wire 22 to reduce sliding resistance of the central wire 22 within the outer case 26. In the first illustrated embodiment, the radial protrusion 24 (the at least one resin string) is preferably made of either a fluorocarbon polymer or an olefin polymer. Alternatively, the radial protrusion 24 (the at least one resin string) is preferably made of polyethylene terephthalate (PET). If the radial protrusion 24 is made of a fluorocarbon polymer, then the fluorocarbon polymer is preferably selected from a group consisting of perfluoroalkoxy (PFA), fluoroethylene-propylene (PEP) and polytetrafluoroethylene (PTFE). If the radial protrusion 24 is made of an olefin polymer, then the olefin polymeris preferably selected from a group consisting of polyethylene (PE) and polyacetal (POM).

Referring back to FIGS. 1 and 2, the bicycle control cables 14, 16 and 18 are identical as the bicycle control cable 12, as discussed, except for the length of the cables, the diameters of the inner wire and the outer case and the number of pieces of the outer case. In others words, the bicycle control cables 14, 16 and 18 are adapted to the cabling path on the bicycle 10 and the manually operated part and the cable-operated part that are connected to the ends of the inner wire (the central wire and the radial protrusion). Thus, the bicycle control cables 14, 16 and 18 will not be discussed or illustrated in detail herein. Depending on the cabling path of the bicycle control cables 12, 14, 16 and 18 on the bicycle 10 and the bicycle components being attached thereto, one end or each end of the inner wire (the central wire and the radial protrusion) of the bicycle control cables 12, 14, 16 and 18 can be provided with an anchor part or nipple 40 such as shown in FIG. 2. The anchor part 40 can be fixed to the tip end of the inner wire (i.e. the central wire and the radial protrusion) by crimping or other suitable fastening method, Also one end or each end of the outer case of the bicycle control cables 12, 14, 16 and 18 can be provided with a cap 42 for engaging one of the stops 20 or for engaging the bicycle component being attached thereto.

Referring now to FIGS. 6 to 9, a bicycle control cable 112 now be explained in accordance with a second embodiment. The bicycle control cable 112 basically, includes a central wire 122 and a radial protrusion 124. Preferably, as shown, the radial protrusion 124 and the central wire 122 are attached to each other by thermal melting. In this way, the radial protrusion 124 does not move relative to the central wire 122. The central wire 122 and the radial protrusion 124 form an inner wire. An outer case 126 may be provided over a majority of the central wire 122 and the radial protrusion 124. The bicycle control cables 12 and 112 are identical except that the radial protrusions 24 and 124 are different and one of the outer metallic strands of the central wire 122 has been eliminated in the bicycle control cable 112. In view of the similarity between the first and second embodiments, the description of the outer case 126, which is identical to the outer case 26, has been omitted for the sake of brevity.

The inner wire (i.e., the central wire 122 and the radial protrusion 124) slides within the outer case 126. The ends of the inner wire (i.e., the central wire 122 and the radial protrusion 124) protrude beyond both ends of the outer case 126. One end of the central wire 122 is connected to a manually operated part, while the other end of the central wire 122 is connected to a cable-operated part.

Figure 7:
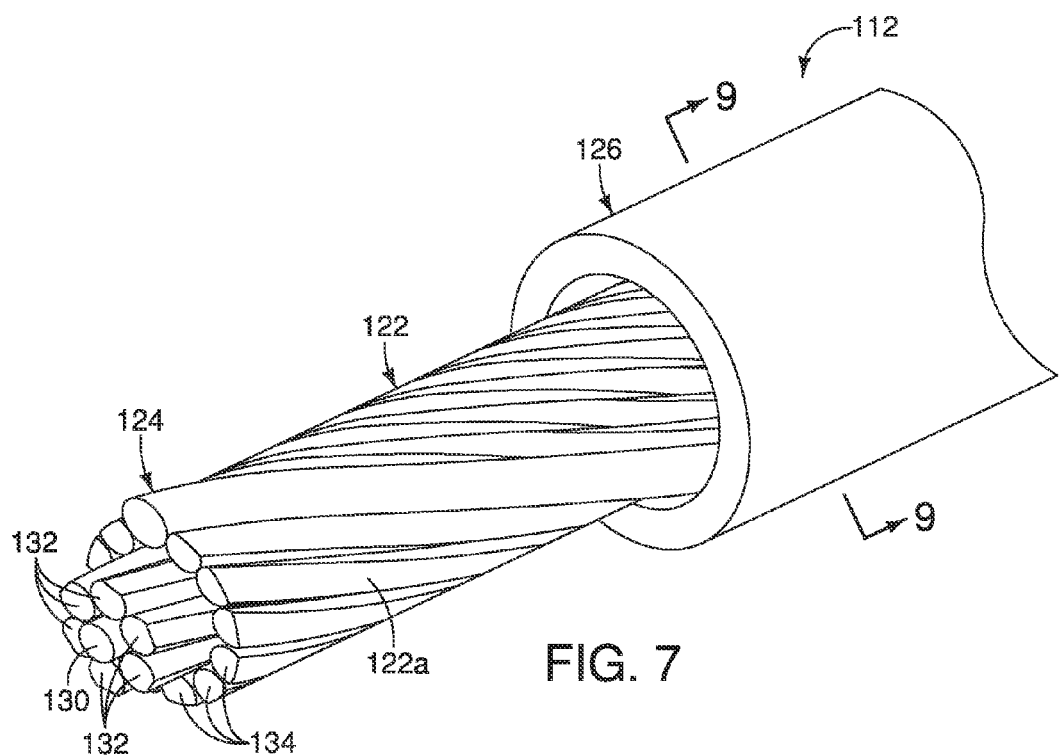
FIG. 7 is an enlarged perspective view of a portion of the bicycle control cable illustrated in FIG. 6 with portions removed for purposes of illustration.
Figure 9:
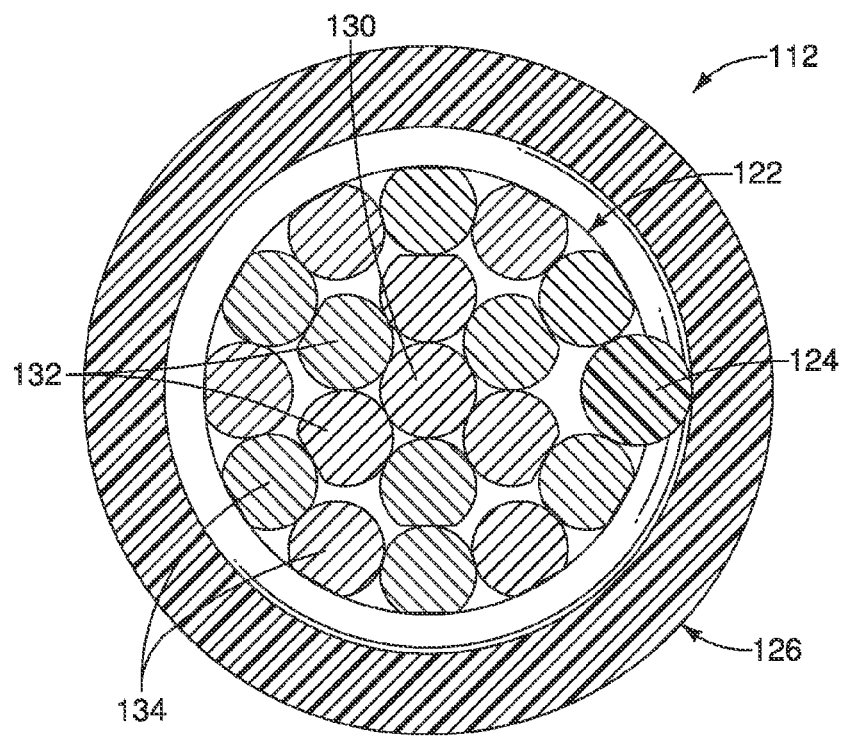
FIG. 9 is a transverse cross sectional view of the bicycle control cable illustrated in FIGS. 6 to 8 as seen along section line 9-9 of FIG. 7.

As best seen in FIGS. 7 and 9, in the second illustrated embodiment, the central wire 122 includes a center metallic strand 130, a plurality of middle metallic strands 132 and a plurality of outer metallic strands 134. The metallic strands 130, 132 and 134 are helically wound to form a wire with a circular cross section. In the second illustrated embodiment, the central wire 122 has an outermost diameter of about 1.1 millimeters. Alternatively, the central wire 122 can be a single metallic strand. In the second illustrated embodiment, the outer metallic strands 134 define a radially outermost surface 122a of the central wire 122. Thus, like the first embodiment, the central wire 122 of the second embodiment is made of helically wound steel wire strands.

Preferably, in the second illustrated embodiment, the radial protrusion 124 includes at least one resin string that is spirally wound around the radially outermost surface 122a of the central wire 122. The string forming the radial protrusion 124 has a circular cross section with a diameter of about 500 micrometers, before the radial protrusion 124 is spirally wound around the radially outermost surface 122a of the central wire 122, as compared to the outermost diameter of the central wire 122 which is about 1.1 millimeters. As best seen in FIG. 5, the radial protrusion 124 (the at least one resin string) has a diameter that is larger than the diameters of each of the metallic strands 130, 132 and 134 of the central wire 122. While preferably all of the metallic strands 130, 132 and 134 are about the same size, the metallic strands 130, 132 and 134 can have different sizes. For example, some of the metallic strands 130, 132 and 134 are equal to or smaller than the diameter of the radial protrusion 124 (the at least one resin string) and the one or more of the metallic strands 130 and 132 is larger than the diameter of the radial protrusion 124 (the at least one resin string).

While the radial protrusion 124 is illustrated as a single resin string, the radial protrusion 124 can have other configurations, for example, the radial protrusion 124 can be made of a plurality of helically wound resin strings. Preferably, the radial protrusion 124 is a stretched resin string manufactured through a stretching process so that wear-proof property of the radial protrusion 124 is more improved.

Preferably, the radial protrusion 124 is made of a material that has a lower coefficient of friction than the material of the central wire 122 to reduce sliding resistance of the central wire 122 within the outer case 126. The radial protrusion 124 (the at least one resin string) is made of either a fluorocarbon polymer or an olefin polymer. Alternatively, the radial protrusion 124 (the at least one resin string) is made of polyethylene terephthalate (PET). If the radial protrusion 124 is made of a fluorocarbon polymer, then the fluorocarbon polymer is preferably selected from a group consisting of perfluoroalkoxy (PFA), fluoroethytene-propylene (FEP) and polytetrafluoroethylene (PTFE). If the radial protrusion 124 is made of an olefin polymer, then the olefin polymeris preferably selected from a group consisting of polyethylene (PE) and polyacetal (POM).

Figure 10:
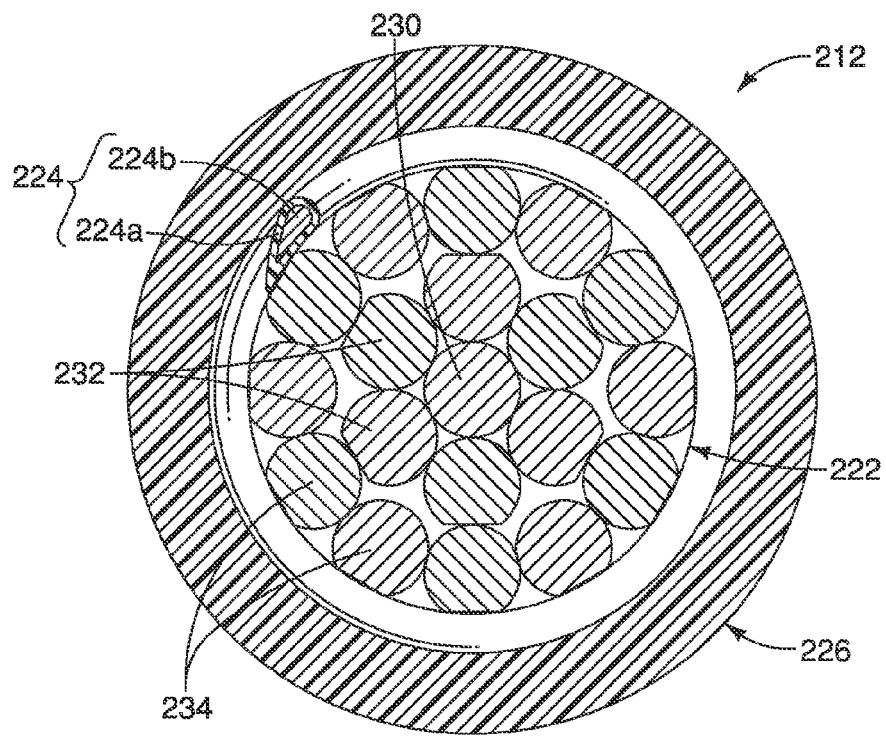

Referring now to FIG. 10, a bicycle control cable 212 will now be explained in accordance with a third embodiment. The bicycle control cable 212 basically, includes a central wire 222 and a radial protrusion 224. The central wire 222 and the radial protrusion 224 form an inner wire. The central wire 222 includes a center metallic strand 230, a plurality of middle metallic strands 232 and a plurality of outer metallic strands 234. An outer case 226 may be provided over a majority of the central wire 222 and the radial protrusion 224. The bicycle control cables 12 and 212 are identical except that the radial protrusions 24 and 224 are different. In view of the similarity between the first and third embodiments, the descriptions of the central wire 222 and the outer case 226, which are identical to the central wire 22 and the outer case 26 have been omitted for the sake of brevity.

Here, the radial protrusion 224 includes at least one resin string that is spirally wound around the central wire 222. The radial protrusion 224 is spirally wound around the central wire 222 in the same manner as shown in FIG. 3A and 4 of the first embodiment. Thus, the description of the spirally winding of the radial protrusion 24 applies to the spirally winding of the radial protrusion 224. The radial protrusion 224 has an outer shell 224a and an inner core 224b. As seen in FIG. 10, the inner core 224b is formed by at least one metallic wire. While the inner core 224b is illustrated as a single metallic wire, the inner core 224b can have other configurations. For example, the inner core 224b can be made of a plurality of helically wound metallic wires. The inner core 224b (e.g., the metallic wire) is coated with a solid lubricant that forms the outer shell 224a. The string forming the radial protrusion 224 has a circular cross section with a diameter of about 80 micrometers.

Here, the solid lubricant of the outer shell 224a is preferably made of either a fluorocarbon polymer or an olefin polymer. Alternatively, the outer shell 224a is preferably made of polyethylene terephthalate (PET). If the solid lubricant of the outer shell 224a is made of a fluorocarbon polymer, then the fluorocarbon polymer is preferably selected from a group consisting of perfluoroalkoxy (PFA), fluoroethylene-propylene (FEP) and polytetrafluomethylene (PTFE). If the solid lubricant of the outer shell 224a is made of an olefin polymer, then the olefin polymeris preferably selected from a group consisting of polyethylene (PE) and polyacetal (POM).

Figure 11:
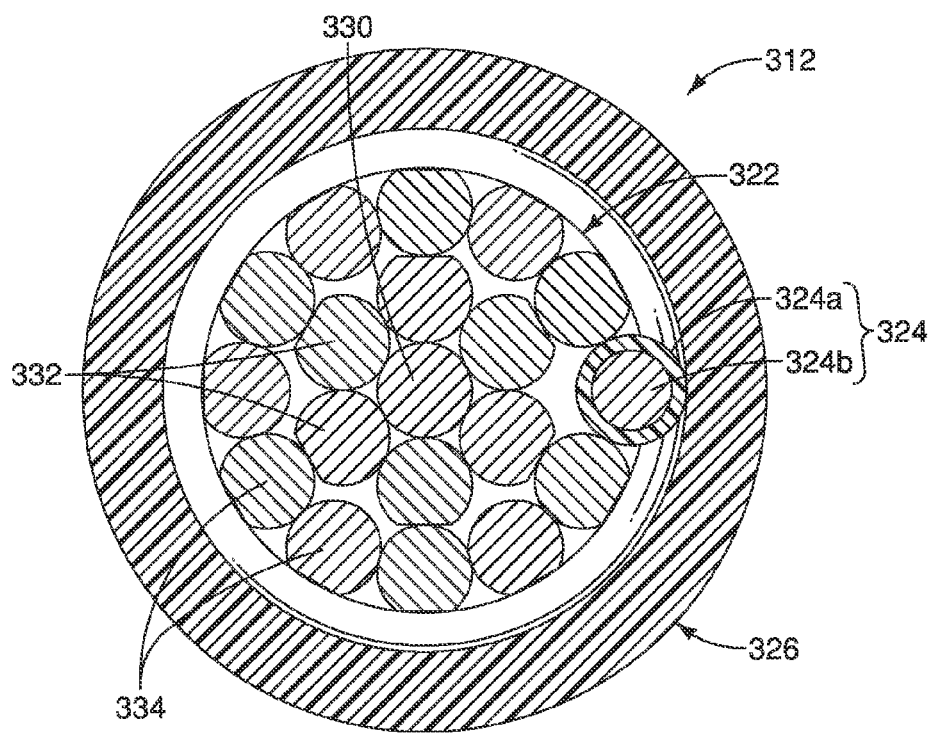
FIG. 11 is a transverse cross sectional view of a bicycle control cable in accordance with a third embodiment.

Referring now to FIG. 11, a bicycle control cable 312 will now be explained in accordance with a fourth embodiment. The bicycle control cable 312 basically, includes a central wire 322 and a radial protrusion 324. The central wire 322 and the radial protrusion 324 form an inner wire. The central wire 322 includes a center metallic strand 330, a plurality of middle metallic strands 332 and a plurality of outer metallic strands 334. An outer case 326 may be provided over a majority of the central wire 322 and the radial protrusion 324. The bicycle control cables 112 and 312 are identical except that the radial protrusions 124 and 324 are different. In view of the similarity between the second and fourth embodiments, the descriptions of the central wire 322 and the outer case 326, which are identical to the central wire 122 and the outer case 126 have been omitted for the sake of brevity.

Figure 8:
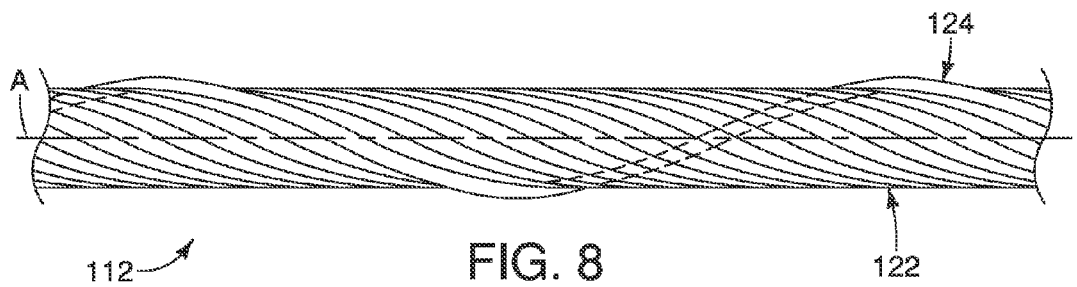
FIG. 8 is an enlarged side elevational view of a portion of the inner wire of the bicycle control cable illustrated in FIGS. 6 and 7.

Here, the radial protrusion 324 includes at least one resin string that is spirally wound around the central wire 322. The radial protrusion 324 is spirally wound around the central wire 322 in the same manner as shown in FIGS. 7 and 8 of the second embodiment. Thus, the description of the spirally winding of the radial protrusion 124 applies to the spirally winding of the radial protrusion 324. The radial protrusion 324 has an outer shell 324a and an inner core 324b. As seen in FIG. 11, the inner core 324b is formed by at least one metallic wire. While the inner core 324b is illustrated as a single metallic wire, the inner core 324b can have other configurations. For example, the inner core 324b can be made of a plurality of helically wound metallic wires. The inner core 324b (e.g., the metallic wire) coated with a solid lubricant that forms the outer shell 324a. The string forming the radial protrusion 324 has a circular cross section with a diameter of about 500 micrometers before the radial protrusion 324 is spirally wound around the radially outermost surface 322a of the central wire 322.

Here, the solid lubricant of the outer shell 324a is preferably made of either a fluorocarbon polymer or an olefin polymer. Alternatively, the outer shell 324a is preferably made of polyethylene terephthalate (PET). If the solid lubricant of the outer shell 324a is made of a fluorocarbon polymer, then the fluorocarbon polymer is preferably selected from a group consisting of perfluoroalkoxy (PFA), fluoroethylene-propylene (FEP) and polytetrafluoroethylene (PTFE). If the solid lubricant of the outer shell 324a is made of an olefin polymer, then the olefin polymeris preferably selected from a group consisting of polyethylene (PE) and polyacetal (POM).

Figure 12:
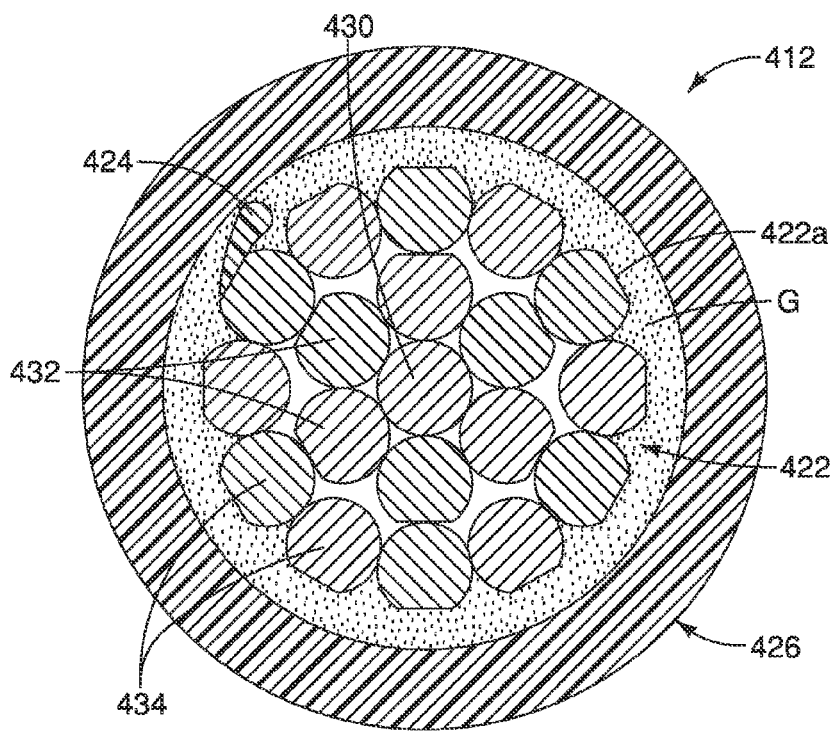
FIG. 12 is a transverse cross sectional view of a bicycle control cable in accordance with a fifth embodiment.

Referring now to FIG. 12, a bicycle control cable 412 will now be explained in accordance with a fifth embodiment. The bicycle control cable 412 basically, includes a central wire 422 and a radial protrusion 424. The central wire 422 and the radial protrusion 424 form an inner wire. The central wire 422 includes a center metallic strand 430, a plurality of middle metallic strands 432 and a plurality of outer metallic strands 434. An outer case 426 may be provided over a majority of the central wire 422 and the radial protrusion 424. The bicycle control cable 412 is identical to the bicycle control cable 12, as described above, except that a coating of grease G is applied over the central wire 422 and the radial protrusion 424 so that he grease G is provided in the pitches of the radial protrusion 424. Since the radial protrusion 424 includes at least one string that is spirally wound around the central wire 422, the radially outermost surface of the central wire 422 is exposed in areas between corresponding circumferential points of the radial protrusion 424 at each pitch of the radial protrusion 424. Thus, the grease G interpenetrates between the outer metallic strands 434 of the central wire 422, preferably up to between the middle metallic strands 432 and the center metallic strand 430, through the exposed portion of the radially outermost surface of the central wire 422 so that friction resistance between the metallic strands of the central wire 422 can be reduced during operation of the bicycle control cable 412. In this way, the exposed portion of the radially outermost surface of the central wire 422 between the windings of the radial protrusion 424 is filled by the grease G so that sliding resistance between the outer case 426 and the central wire 422 with the radial protrusion 424 can be reduced during operation of the bicycle control cable 412. Since the bicycle control cables 12 and 412 are identical, except for the coating of grease G, the descriptions of the central wire 422, the radial protrusion 424 and the outer case 426 have been omitted for the sake of brevity.

Figure 13:
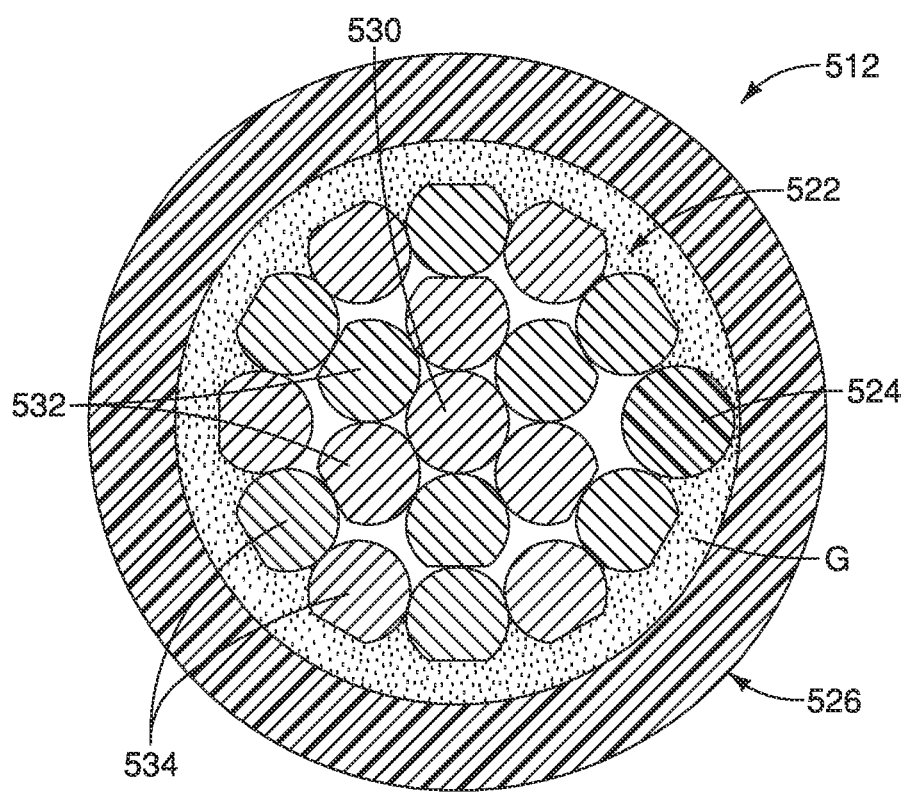
FIG. 13 is a transverse cross sectional view of a bicycle control cable in accordance with a sixth embodiment.

Referring now to FIG. 13, a bicycle control cable 512 will now be explained in accordance with a sixth embodiment. The bicycle control cable 512 basically, includes a central wire 522 and a radial protrusion 524. The central wire 522 and the radial protrusion 524 form an inner wire. The central wire 522 includes a center metallic strand 530, a plurality of middle metallic strands 532 and a plurality of outer metallic strands 534. An outer case 526 may be provided over a majority of the central wire 522 and the radial protrusion 524. The bicycle control cable 512 is identical to the bicycle control cable 112, as described above, except that a coating of grease G is applied over the central wire 522 and the radial protrusion 524. Since the radial protrusion 524 includes at least one string that is spirally wound around the central wire 522, the radially outermost surface of the central wire 522 is exposed in areas between corresponding circumferential points of the radial protrusion 524 at each pitch of the radial protrusion 524. Thus, the grease G interpenetrates between the outer metallic strands 534 of the central wire 522, preferably up to between the middle metallic strands 532 and the center metallic strand 530, through the exposed portion of the radially outermost surface of the central wire 522 so that friction resistance between the metallic strands of the central wire 522 can be reduced during operation of the bicycle control cable 512. In this way, the exposed portion of the radially outermost surface of the central wire 522 between the windings of the radial protrusion 524 is filled by the grease G so that sliding resistance between the outer case 526 and the central wire 522 with the radial protrusion 524 can be reduced during operation of the bicycle control cable 512. Since the bicycle control cables 112 and 512 are identical, except for the coating of grease G, the descriptions of the central wire 522, the radial protrusion 524 and the outer case 526 have been omitted for the sake of brevity.

Figure 14:
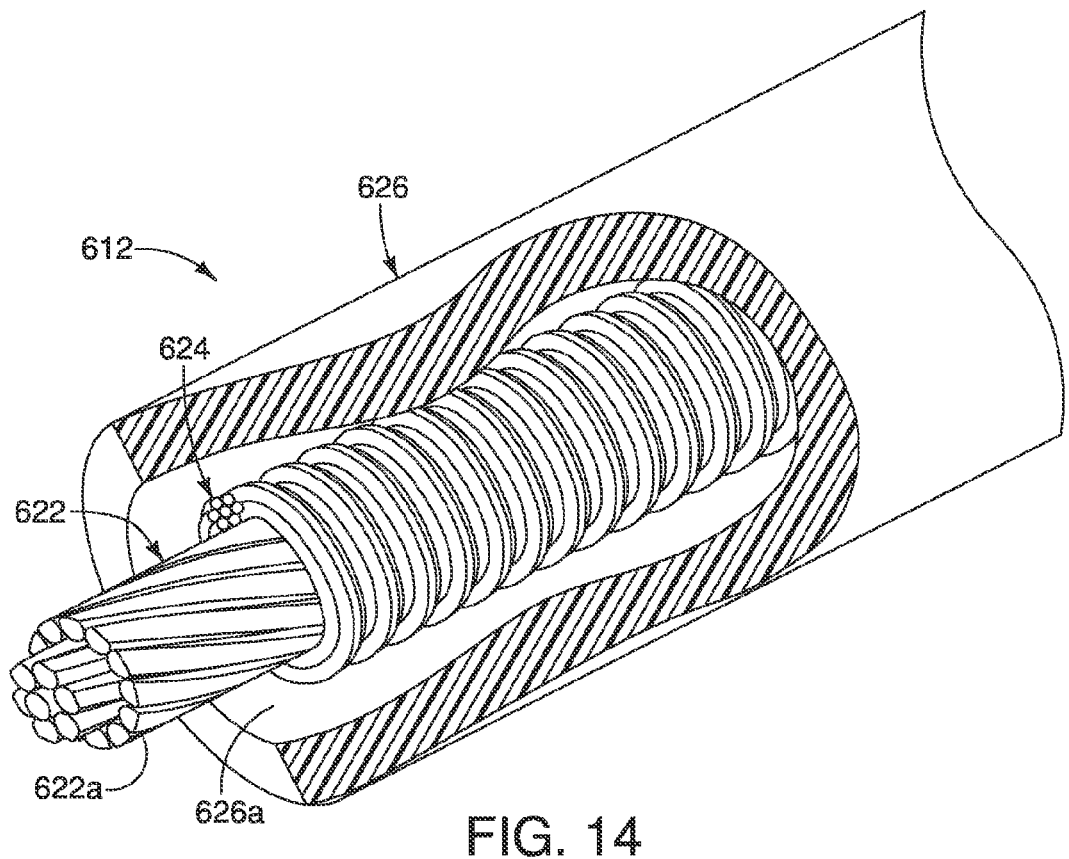
FIG. 14 is an enlarged, partial perspective of a portion of a bicycle control cable in accordance with a seventh embodiment with a portion of the outer case removed for purposes of illustration.
Figure 15:
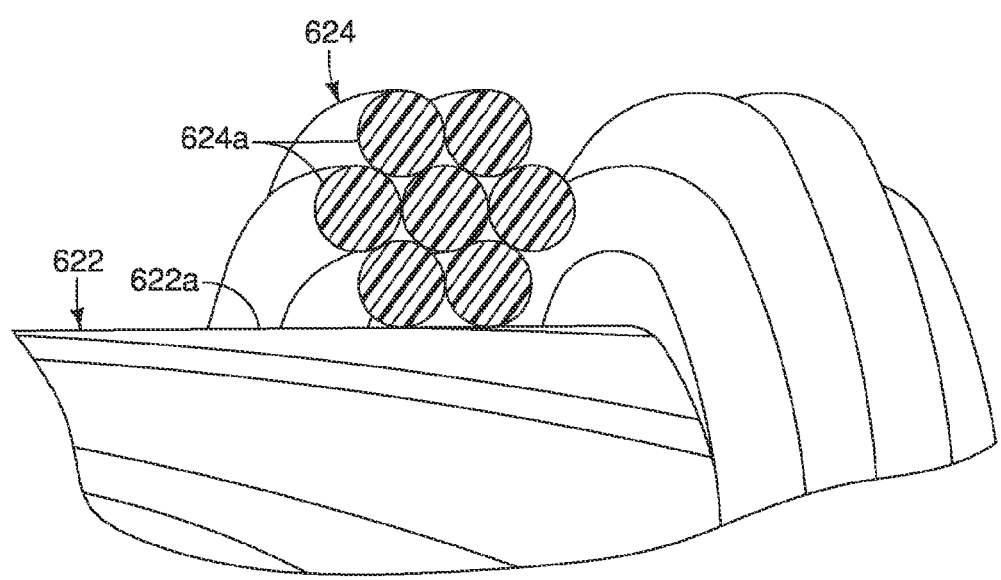
FIG. 15 is a further enlarged, partial perspective view of a portion of the bicycle control cable illustrated in FIG. 14 with the outer case removed for purposes of illustration.

Referring now to FIGS. 14 and 15, a bicycle control cable 612 will now be explained in accordance with a seventh embodiment. The bicycle control cable 612 basically, includes a central wire 622, a radial protrusion 624 and an outer case 626. In this embodiment, the radial protrusion 624 is a resin strand (a plurality of strings 624a twined about each other) that is non-movably disposed on a radially outermost surface 622a of the central wire 622 to move with the central wire 622 relative to the outer case 626. The resin material for the strings 624a of the radial protrusion 624 can be a fluorocarbon polymer that is preferably selected from a group consisting of perfluoroalkoxy, fluoroethylene-propylene and polytetrafluoroethylene, or an olefin polymer that is selected from a group consisting of polyethylene and polyacetal, or a polyethylene terephthalate polymer. The radial protrusion 624 reduces a sliding resistance of the central wire 622 relative to the outer case 626 by reducing surface contact therebetween and due to the material of the radial protrusion 624 having a low coefficient of friction than the material of the central wire 626, Thus, the central wire 622 and the radial protrusion 624 form an inner wire that slides within the outer case 626. The outer case 626 may be provided over a majority of the central wire 622 and the radial protrusion 624. The outer case 626 has a radially innermost surface 626a that has an inner diameter or inner maximum transverse width that is larger than the outer diameter or outer maximum transverse width formed by the radial protrusion 624. The central wire 622 is a metallic multi-strand wire that is identical to the prior embodiments. However, it will be apparent from this disclosure that the central wire 622 can be a solid metallic strand or a different construction if needed and/or desired.

Basically, the bicycle control cable 612 is identical to the bicycle control cable 12, as described above, except that the radial protrusion 624 has been changed from a solid resin strand to a multi-string resin strand. In particular, the radial protrusion 624 is a resin strand having a plurality of strings twined about each other. By using a multi-string resin strand, the radial protrusion 624 has an overall non-single-circular cross sectional shape that reduces a sliding resistance of the central wire 622. Of course, it will be apparent from this disclosure that other variations can be made without departing from the invention. For example, the bicycle control cable 612 can include, such as, applying a coating of grease over the central wire 622 and the radial protrusion 624, and/or having the individual strands of the radial protrusion 624 can be coated with a solid lubricant that forms an outer shell over an inner core.

Figure 16:
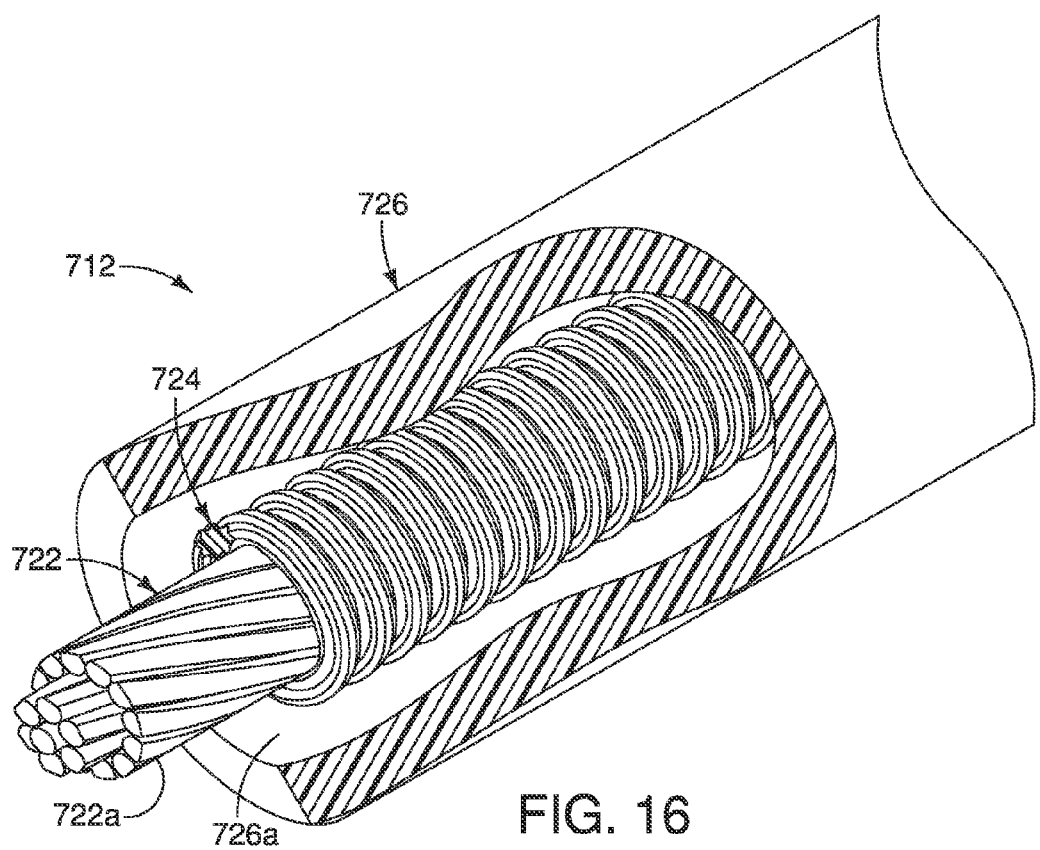
FIG. 16 is an enlarged, partial perspective of a portion of a bicycle control cable in accordance with an eighth embodiment with a portion of the outer case removed fur purposes of illustration.
Figure 17:
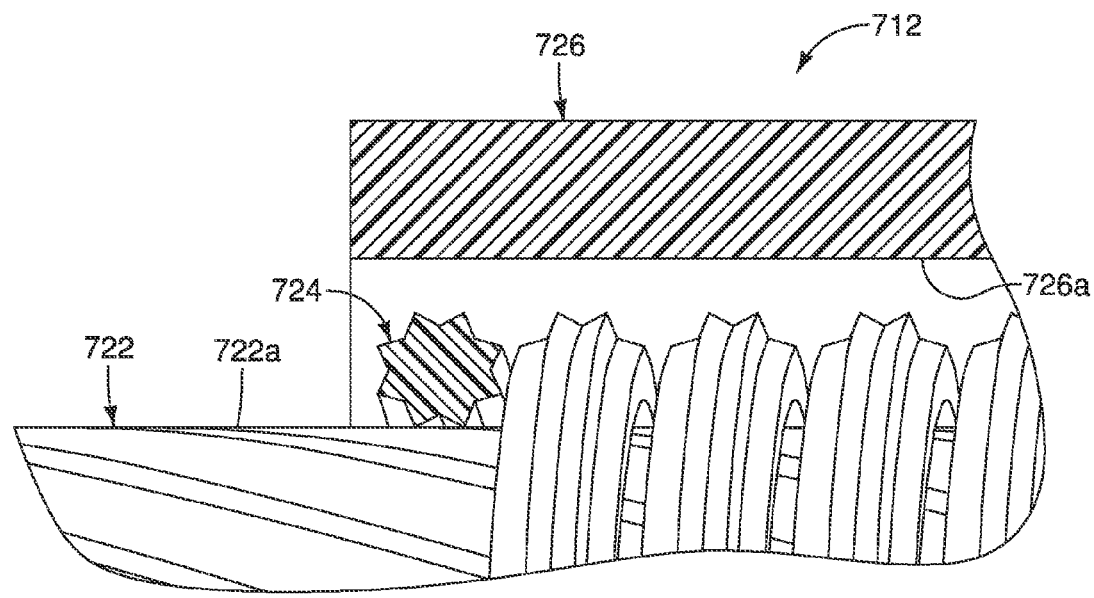
FIG. 17 is a further enlarged, partial perspective view of a portion of bicycle control cable illustrated in FIG. 16.

Referring now to FIGS. 16 and 17, a bicycle control cable 712 will now be explained in accordance with an eighth embodiment, The bicycle control cable 712 basically, includes a central wire 722, a radial protrusion 724 and an outer case 726, In this embodiment, the radial protrusion 724 is a resin strand that is non-movably disposed on a radially outermost surface 722a of the central wire 722 to move with the central wire 722 relative to the outer case 726. The resin material for the radial protrusion 724 can be a fluorocarbon polymer that is preferably selected from a group consisting of perfluoroalkoxy, fluoroethylene-propylene and polytetrafluoroethylene, or an olefin polymer that is selected from a group consisting of polyethylene and polyacetal, or a polyethylene terephthalate polymer. The radial protrusion 724 reduces a sliding resistance of the central wire 722 relative to the outer case 726 by reducing surface contact therebetween and due to the material of the radial protrusion 724 having a low coefficient of friction than the material of the central wire 726. Thus, the central wire 722 and the radial protrusion 724 form an inner wire that slides within the outer case 726. The outer case 726 may be provided over a majority of the central wire 722 and the radial protrusion 724. The outer case 726 has a radially innermost surface 726a that has an inner diameter or inner maximum transverse width that is larger than the outer diameter or outer maximum transverse width formed by the radial protrusion 724. The central wire 722 is a metallic multi-strand wire that is identical to the prior embodiments. However, it will be apparent from this disclosure that the central wire 722 can be a solid metallic strand or a different construction if needed and/or desired.

The bicycle control cable 712 is identical to the bicycle control cable 12, as described above, except that the radial protrusion 724 has been changed from a solid resin strand with a circular cross sectional shape to a splined cross sectional shape (i.e., a star cross sectional shape in the illustrated embodiment). In other words, the radial protrusion 724 has an overall non-single-circular cross sectional shape that reduces a sliding resistance of the central wire 722. Of course, it will be apparent from this disclosure that other variations can be made without departing from the invention. For example, the bicycle control cable 712 can include, such as, applying a coating of grease over the central wire 722 and the radial protrusion 724, and/or having the individual strands of the radial protrusion 724 can be coated with a solid lubricant that forms an outer shell over an inner core. Moreover, the non-circular cross sectional shape of the radial protrusion 724 is not limited to a splined cross sectional shape having an eight point star shape defining eight longitudinally extending splines. For example, the non-circular cross sectional shape of the radial protrusion 724 can have longitudinally extending splines having a rectangular cross section with a planar or curved outermost surface. Also, the splined cross sectional shape of the radial protrusion 724 is not limited to eight longitudinally extending splines.

Figure 18:
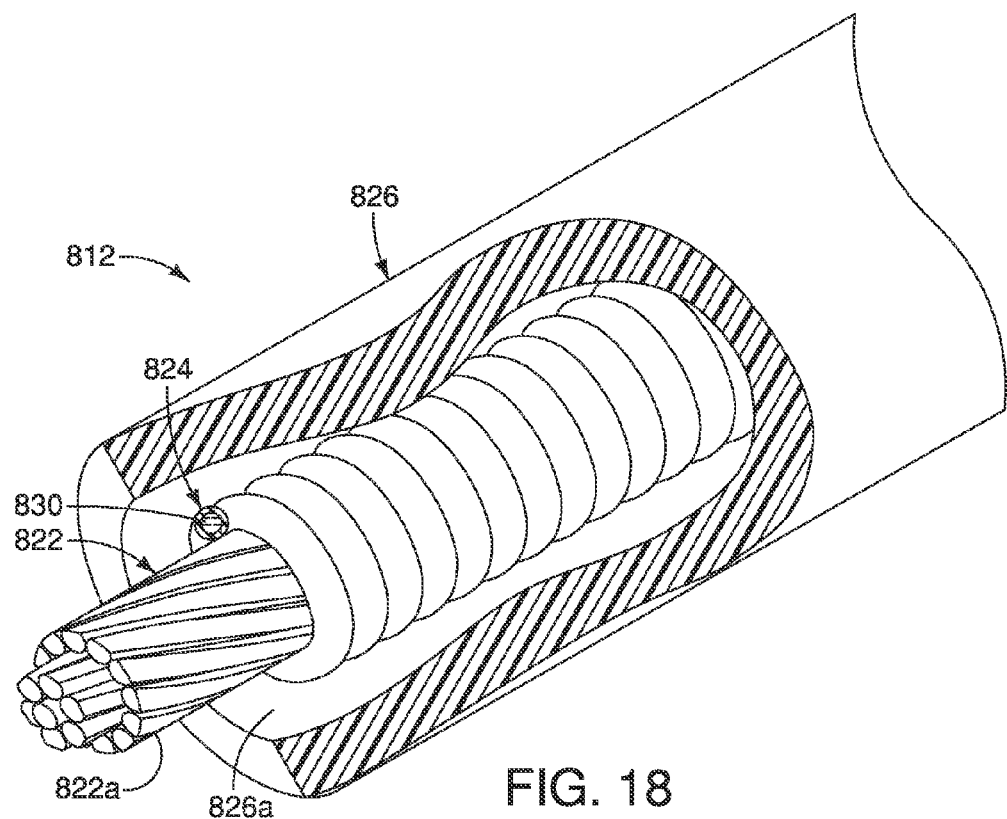
FIG. 18 is an enlarged, partial perspective of a portion of a bicycle control cable in accordance with a ninth embodiment with a portion of the outer case removed for purposes of illustration.
Figure 19:
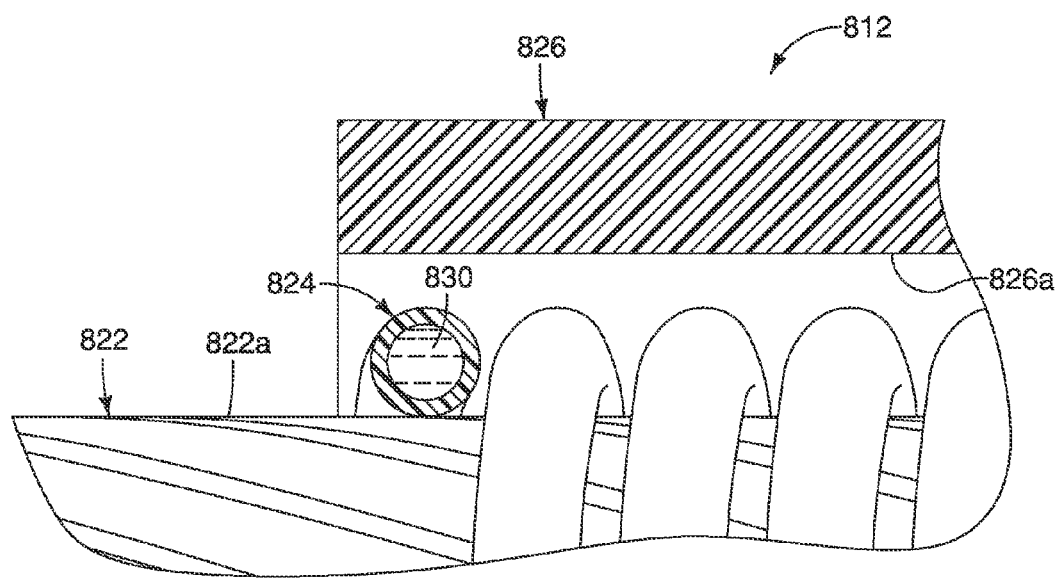
FIG. 19 is a further enlarged, partial perspective view of a portion of the bicycle control cable illustrated in FIG. 18.
Figure 20:
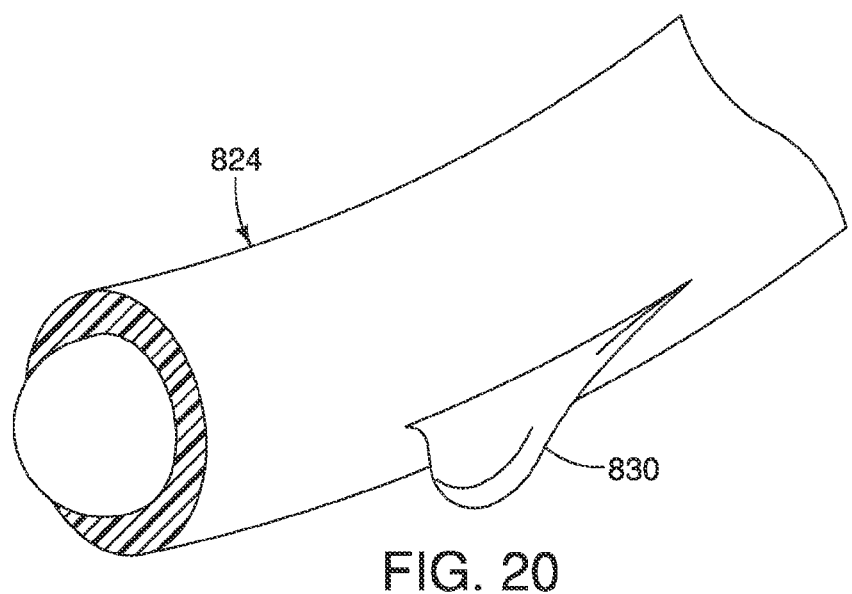
FIG. 20 is a further enlarged, partial perspective view of a portion radial protrusion of the bicycle control cable illustrated in FIGS. 18 and 19.

Referring now to FIGS. 18 to 20, a bicycle control cable 812 will now be explained in accordance with a ninth embodiment. The bicycle control cable 812 basically, includes a central wire 822, a radial protrusion 824 and an outer case 826. In this embodiment, the radial protrusion 824 is a resin strand that is non-movably disposed on a radially outermost surface 822a of the central wire 822 to move with the central wire 822 relative to the outer case 826. Thus, the central wire 822 and the radial protrusion 824 form an inner wire that slides within the outer case 826. The outer case 826 may be provided over a majority of the central wire 822 and the radial protrusion 824. The outer case 826 has a radially innermost surface 826a that has an inner diameter or inner maximum transverse width that is larger than the outer diameter or outer maximum transverse width formed by the radial protrusion 824. The central wire 822 is a metallic multi-strand wire that is identical to the prior embodiments. However, it will be apparent from this disclosure that the central wire 822 can be a solid metallic strand or a different construction if needed and/or desired.

The bicycle control cable 812 is identical to the bicycle control cable 12, as described above, except that the radial protrusion 824 has been changed from a solid resin strand with a circular cross sectional shape to a tubular resin strand having a lubricant 830 disposed in a tubular space of the tubular resin strand. As seen in FIG. 20, by filling the interior of the radial protrusion 824 with the lubricant 830, if the tubular wall of the radial protrusion 824 happens to tear or break, then the lubricant 830 will be automatically supplied to the area between the outer case 826 and the central wire 822 to reduce a sliding resistance of the central wire 822 within the outer case 826. The resin material for the radial protrusion 824 can be a fluorocarbon polymer that is preferably selected from a group consisting of perfluoroalkoxy, fluoroethylene-propylene and polytetrafluoroethylene, or an olefin polymer that is selected from a group consisting of polyethylene and polyacetal, or a polyethylene terephthalate polymer.

Of course, it will be apparent from this disclosure that other variations can be made without departing from the invention. For example, the bicycle control cable 812 can include, such as, applying a coating of grease over the central wire 822. The exterior shape of the radial protrusion 824 can be changed from a circular cross sectional shape to a splined circular cross sectional shape (i.e., a star cross sectional shape in the illustrated embodiment). In other words, the radial protrusion 824 can have any of the configurations of any of the other embodiments disclosed herein as needed and/or desired.

Figure 21:
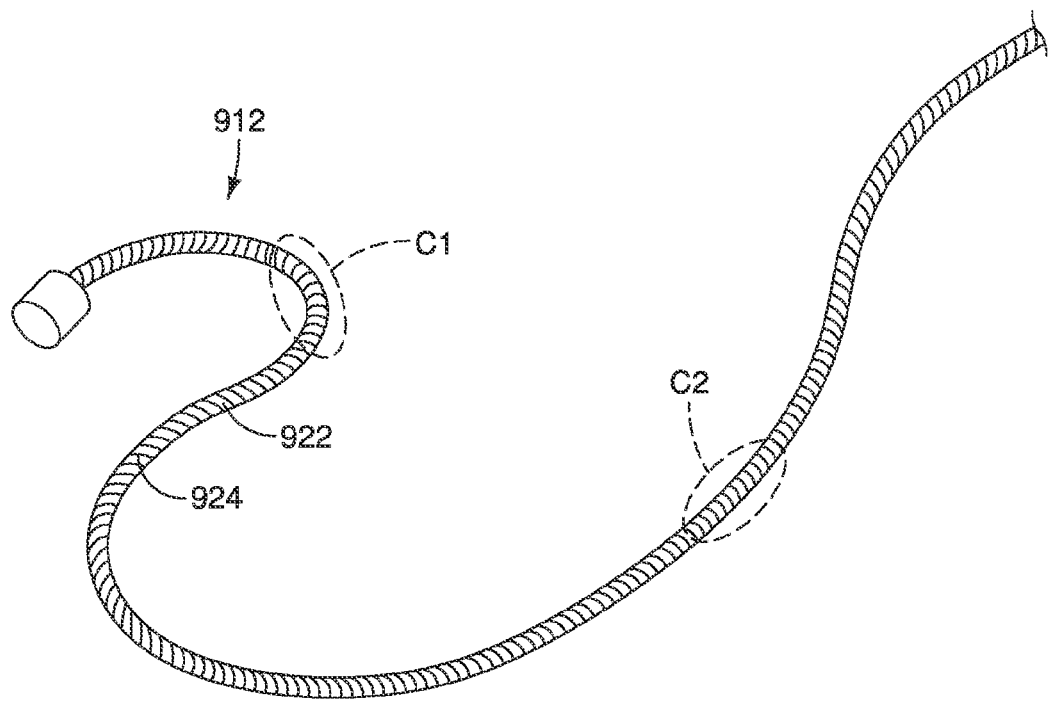
FIG. 21 is a perspective view of a portion of a bicycle control cable in accordance with a tenth embodiment with the outer case removed for purposes of illustration.
Figure 22:
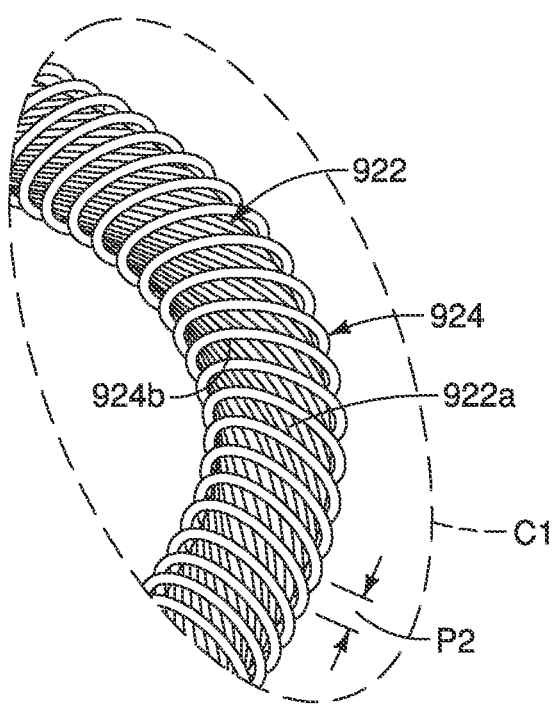
FIG. 22 is an enlarged, partial perspective of the encircled portion C1 of the bicycle control cable illustrated in FIG. 21.
Figure 23:
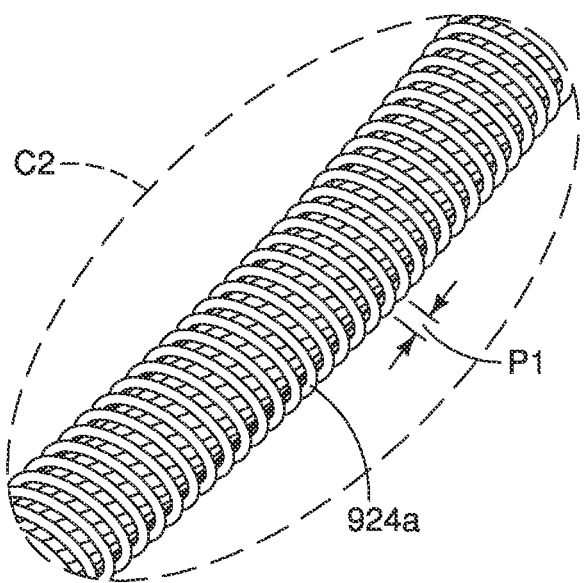
FIG. 23 is an enlarged, partial perspective of the encircled portion C2 of the bicycle control cable illustrated in FIG. 21.

Referring now to FIGS. 21 to 23, a bicycle control cable 912 will now be explained in accordance with a tenth embodiment. The bicycle control cable 912 basically, includes a central wire 922, a radial protrusion 924 and an outer case (not shown), In this embodiment, the radial protrusion 924 is a solid resin strand that is non-movably disposed on a radially outermost surface 922a of the central wire 922 to move with the central wire 922 relative to the outer case 926. However, the radial protrusion 924 can be configured in the same manner as any of the other embodiments that are disclosed herein (e.g., either a multi-strand wire or a solid strand wire). The resin material for the radial protrusion 924 can be a fluorocarbon polymer that is preferably selected from a group consisting of perfluoroalkoxy, fluoroethylene-propylene and polytetrafluoroethylene, or an olefin polymer that is selected from a group consisting of polyethylene and polyacetal, or a polyethylene terephthalate polymer. The central wire 922 and the radial protrusion 924 form an inner wire that slides within the outer case 922. However, the radial protrusion 924 can be disposed on a radially innermost surface of the outer case 922 as in two of the later embodiments. The outer case (not shown) may be provided over a majority of the central wire 922 and the radial protrusion 924. Here, the outer case 922 is the same as the prior embodiments. The central wire 922 is a metallic multi-strand wire that is identical to the prior embodiments. However, it will be apparent from this disclosure that the central wire 922 can be a solid wire if needed and/or desired. Here, the radial protrusion 924 is a resin strand that is identical to the radial protrusion 24, as discussed above, except for the pitch of the radial protrusion 924 varies (i.e., non-uniform). In particular, as seen in FIGS. 22 and 23, the radial protrusion 924 has a first section 924a (FIG. 23) with a first pitch P1 (same as the first embodiment) and a second section 924b (FIG. 22) with a second pitch P2. The first section 924a preferably corresponds to a middle section of the bicycle control cable 912 that is located between first and second end sections of the bicycle control cable 912. Preferably, the first section 924a corresponds to straight sections of the bicycle control cable 912 when the bicycle control cable 912 is installed on the bicycle. The second section 924b corresponds to preferably at least one of the first and second end sections of the bicycle control cable 912. Preferably, the second section 924b corresponds to curved sections of the bicycle control cable 912 when the bicycle control cable 912 is installed on the bicycle. Thus, depending on the particular bicycle, one or more middle sections of the bicycle control cable 912 can have the radial protrusion 924 provided with the second pitch P2 that are bounded by sections with the radial protrusion 924 having the first pitch P1. The second pitch P2 of the second section 924b is larger than the first pitch P1 of the first section 924a. By having the first and second pitches P1 and P2 being different, less resin is needed in manufacturing the bicycle control cable 912.

Basically, the bicycle control cable 912 is identical to the bicycle control cable 12, as described above, except that pitch of the radial protrusion 924 is non-uniform as discussed above, Of course, it will be apparent from this disclosure that other variations can be made without departing from the invention. For example, the bicycle control cable 912 can include, such as, applying a coating of grease over the central wire 922 and the radial protrusion 924, and/or coating the radial protrusion 924 a solid lubricant that forms an outer shell over an inner core. Also the radial protrusion 924 can have any of the configurations of any of the other embodiments disclosed herein as needed and/or desired.

Figure 24:
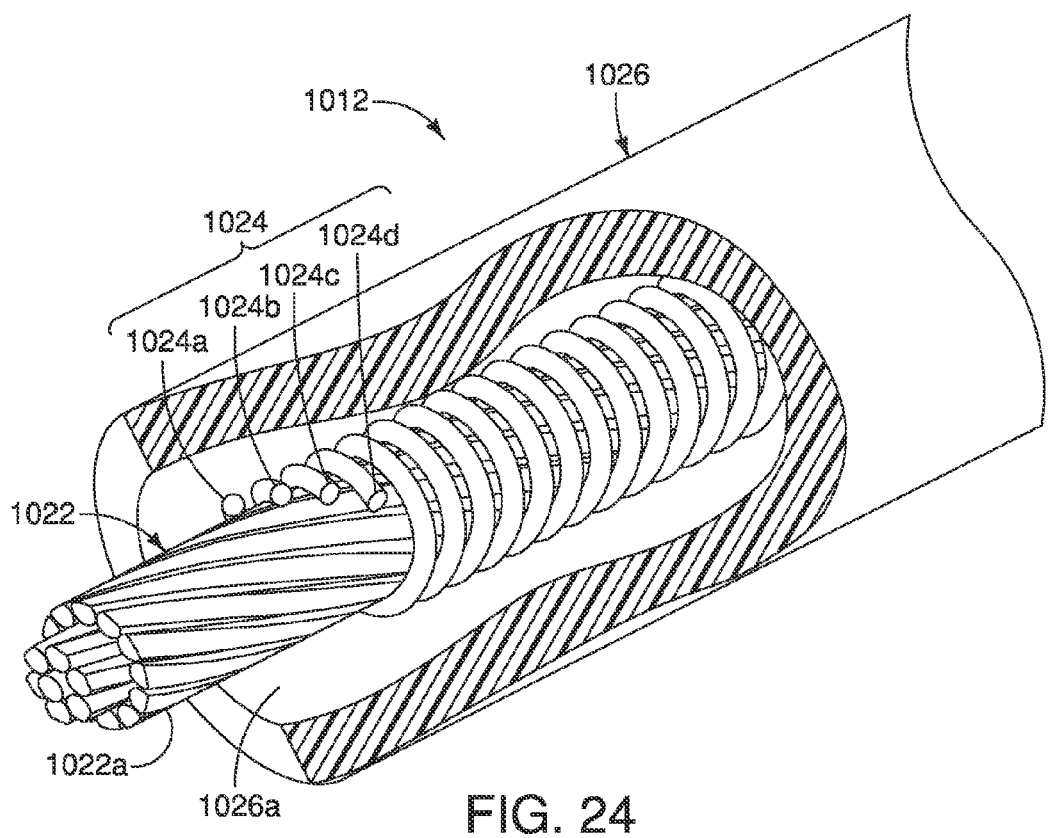
FIG. 24 is an enlarged perspective view of a portion of a bicycle control cable in accordance with an eleventh embodiment with a portion of the outer case removed for purposes of illustration.
Figure 25:
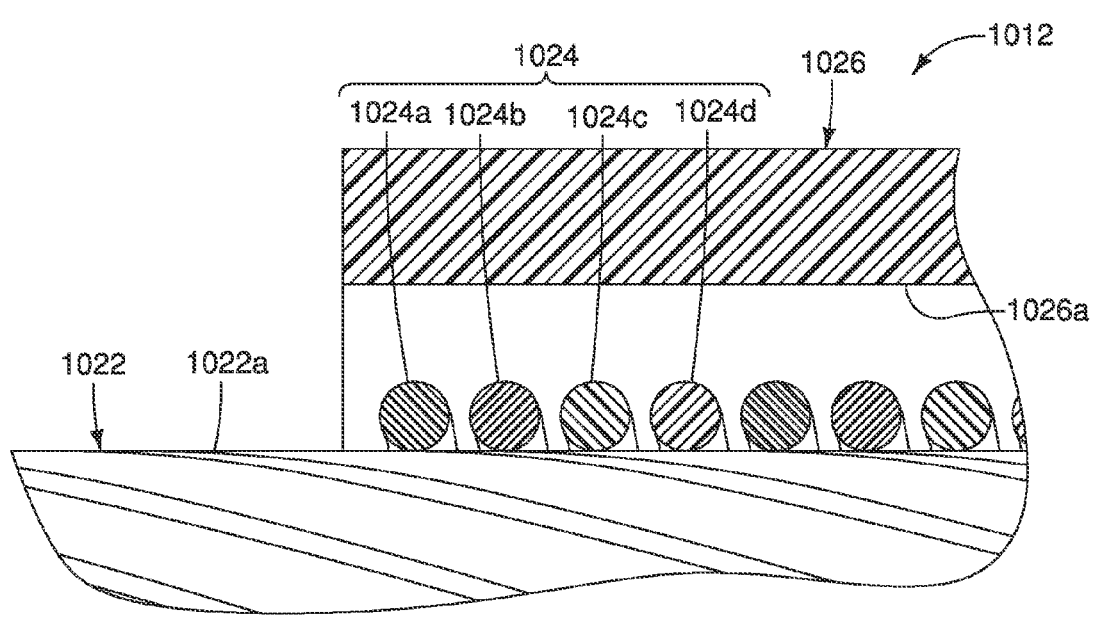
FIG. 25 is a further enlarged partial cross sectional view of a portion of the bicycle control cable illustrated in FIG. 24.

Referring now to FIGS. 24 and 25, a bicycle control cable 1012 will now be explained in accordance with an eleventh embodiment. The bicycle control cable 1012 basically, includes a central wire 1022, a radial protrusion 1024 and an outer case 1026. In this embodiment, the radial protrusion 1024 includes a first strand 1024a extending spirally along a radially outermost surface 1022a of the central wire 1022, a second strand 1024b extending spirally along the radially outermost surface 1022a of the central wire 1022, a third strand 1024c extending spirally along a radially outermost surface 1022a of the central wire 1022, and a fourth strand 1024d extending spirally along the radially outermost surface 1022a of the central wire 1022, Each of the strands 1024a to 1024d is a solid resin strand that is non-movably disposed on the radially outermost surface 1022a of the central wire 1022 to move with the central wire 1022 relative to the outer case 1026. The radial protrusion 1024 reduces a sliding resistance of the central wire 1022 relative to the outer case 1026 by reducing surface contact therebetween and due to the material of the radial protrusion 1024 having a low coefficient of friction than the material of the central wire 1026. Thus, the central wire 1022 and the radial protrusion 1024 form an inner wire. An outer case 1026 may be provided over a majority of the central wire 1022 and the radial protrusion 1024. The outer case 1026 has a radially innermost surface 1026a that has an inner diameter or inner maximum transverse width that is larger than the outer diameter or outer maximum transverse width formed by the radial protrusion 1024. Here, the construction of the outer case 1026 is the same as the prior embodiments. The central wire 1022 is a metallic multi-strand wire that is identical to the prior embodiments. However, it will be apparent from this disclosure that the central wire 1022 can be a solid metallic strand or a different construction if needed and/or desired.

Here, the strands 1024a to 1024d forming the radial protrusion 1024 are each a resin strand that is basically circular in cross section, The resin materials for the strands 1024a to 1024d can be any combination of fluorocarbon polymers that are preferably selected from a group consisting of perfluoroalkoxy, fluoroethylene-propylene and polytetrafluoroethylene, and/or olefin polymers that are selected from a group consisting of polyethylene and polyacetal, and/or a polyethylene terephthalate polymer. While the strands 1024a to 1024d are all illustrated as being the same size and the same shape, the strands 1024a to 1024d can vary in size and/or same. In other words, each of the strands 1024a to 1024d can be selected on an individual basis such that they can vary in shape, size, material, and any other characteristic as need and/or desired. Thus, with this configuration, the strands 1024a to 1024d can be each be different, all the same, or any combination of characteristic as need and/or desired.

Basically, the bicycle control cable 1012 is identical to the bicycle control cable 12, as described above, except that the radial protrusion 1024 uses a plurality of stands instead of a single resin strand. Of course, it will be apparent from this disclosure that other variations can be made without departing from the invention. For example, the bicycle control cable 1012 can include, such as, applying a coating of grease over the central wire 1022 and the radial protrusion 1024, and/or having the individual strands of the radial protrusion 1024 can be coated with a solid lubricant that forms an outer shell over an inner core. Also the radial protrusion 1024 can have any of the configurations of any of the other embodiments disclosed herein as needed and/or desired. Also the number of strands that form the radial protrusion 1024 can be increased or decreased as needed and/or desired.

Figure 26:
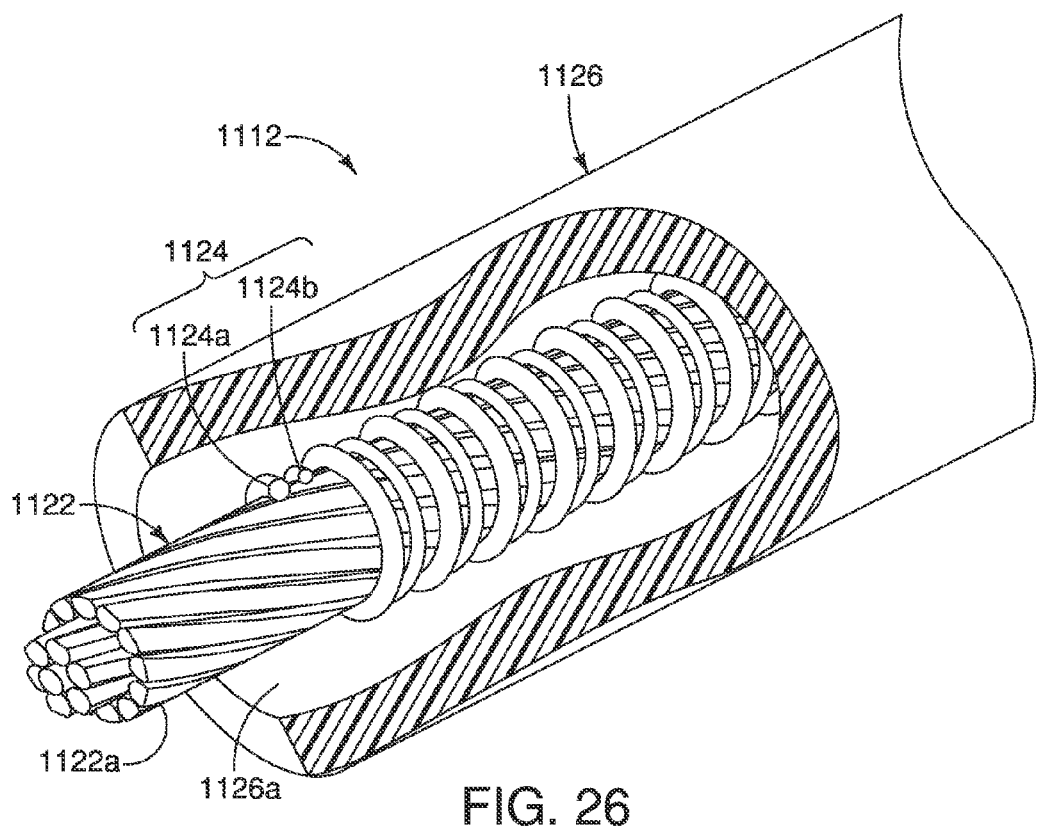
FIG. 26 is an enlarged perspective view of a portion of a bicycle control cable in accordance with a twelfth embodiment with a portion of the outer case removed for purposes of illustration.
Figure 27:
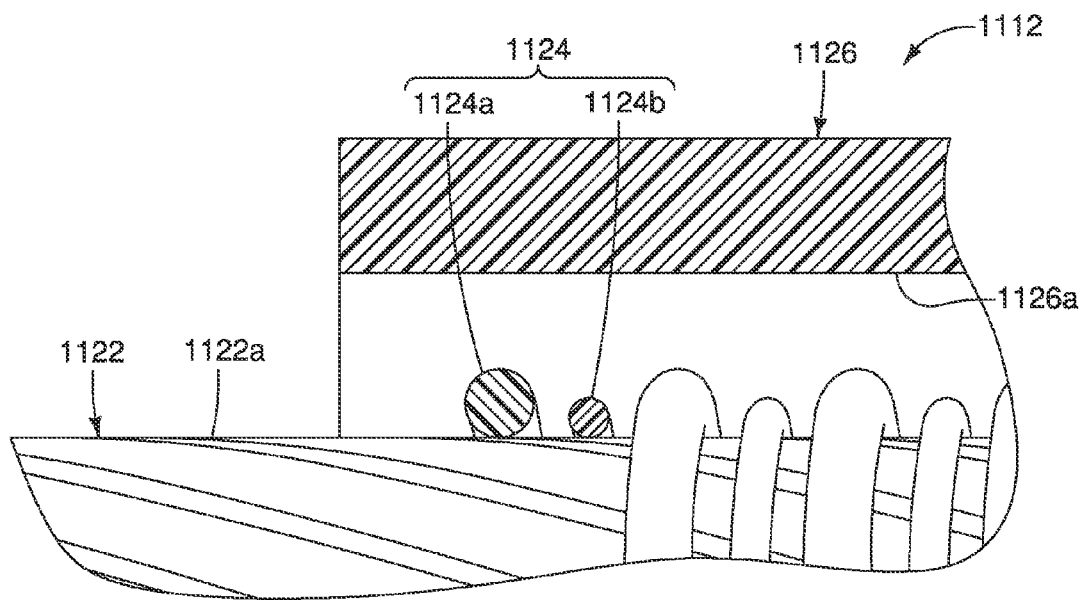
FIG. 27 is a further enlarged partial cross sectional view of a portion of the bicycle control cable illustrated in FIG. 26.

Referring now to FIGS. 26 and 27, a bicycle control cable 1112 will now be explained in accordance with a twelfth embodiment. The bicycle control cable 1112 basically, includes a central wire 1122, a radial protrusion 1124 and an outer case 1126. The central wire 1122 and the radial protrusion 1124 form an inner wire. Here, the radial protrusion 1124 includes a first strand 1124a extending spirally along a radially outermost surface 1122a of the central wire 1122 and a second strand 1124b extending spirally along the radially outermost surface 1122a of the central wire 1122. The outer case 1126 may be provided over a majority of the central wire 1122 and the radial protrusion 1124. The outer case 1126 has a radially innermost surface 1126a that has an inner diameter or inner maximum transverse width that is larger than the outer diameter or outer maximum transverse width formed by the radial protrusion 1124. Here, the construction of the outer case 1126 is the same as the prior embodiments. The central wire 1122 is a metallic multi-strand wire that is identical to the prior embodiments. However, it will be apparent from this disclosure that the central wire 1122 can be a solid metallic strand or a different construction if needed and/or desired.

The first strand 1124a has a different characteristic from the second strand 1124b. The first strand 1124a has a different overall diameter from the second strand 1124b. The first strand 1124a is formed of a different material from the second strand 1124b. Here, the strands 1124a and 1124b forming the radial protrusion 1124 are each a resin strand that is basically circular in cross section. The resin materials for the strands 1124a and 1124b can be any combination of fluorocarbon polymers that are preferably selected from a group consisting of perfluoroalkoxy, fluoroethytene-propylene and polytetrafluoroethylene, and/or olefin polymers that are selected from a group consisting of polyethylene and polyacetal, and/or a polyethylene terephthalate polymer.

Basically, the bicycle control cable 1112 is identical to the bicycle control cable 12, as described above, except that the radial protrusion 1124 has been formed by two strands (e.g., the strands 1124a and 1124b) wherein the diameters of the strands are not equal. Of course, it will be apparent from this disclosure that other variations can be made without departing from the invention. For example, the bicycle control cable 1112 can include, such as, applying a coating of grease over the central wire 1122 and the radial protrusion 1124, and/or having the individual strands of the radial protrusion 1124 can be coated with a solid lubricant that forms an outer shell over an inner core. Also the number of strands that form the radial protrusion 1124 can be increased with some or all of the strands having different diameters as needed and/or desired.

Figure 28:
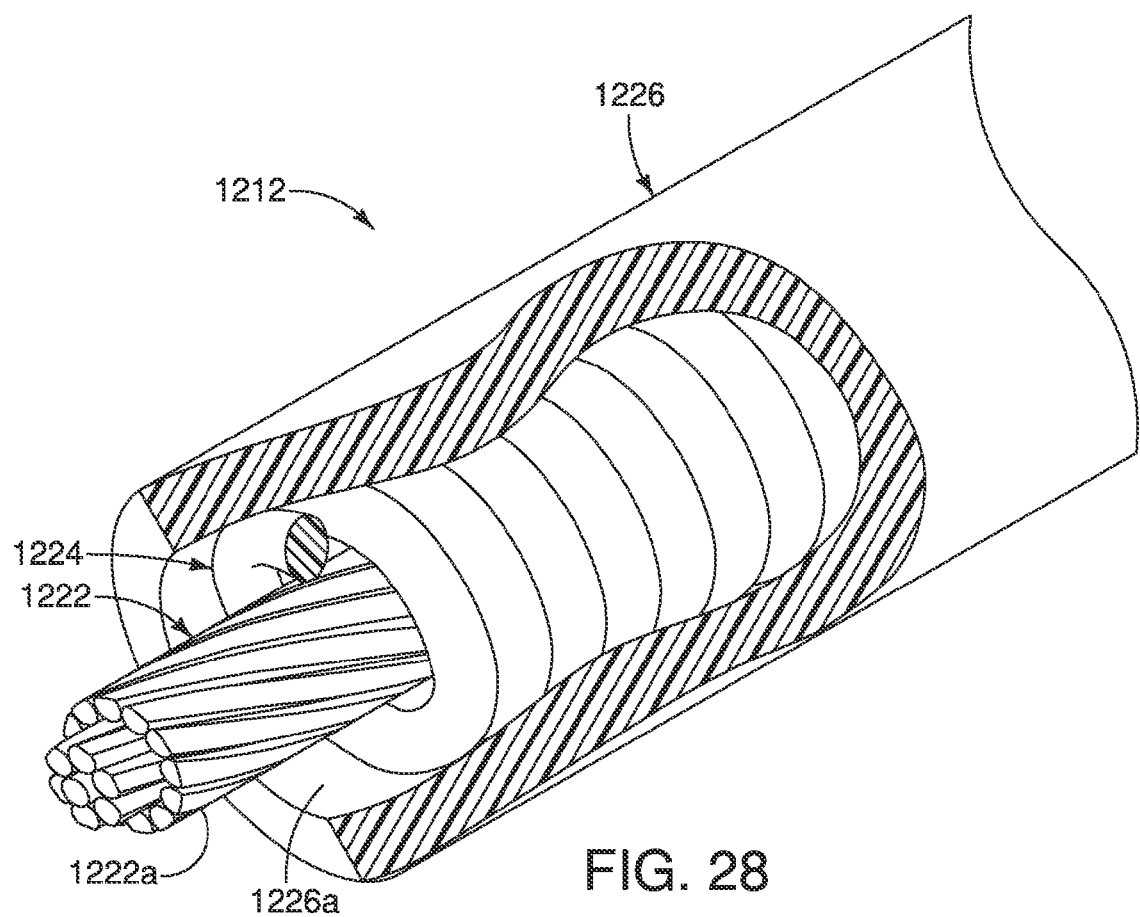
FIG. 28 is an enlarged perspective view of a portion of a bicycle control cable in accordance with a thirteenth embodiment with a portion of the outer case removed for purposes of illustration.

Referring now to FIG. 28, a bicycle control cable 1212 will now be explained in accordance with a thirteenth embodiment. The bicycle control cable 1212 basically, includes a central wire 1222, a radial protrusion 1224 and an outer case 1226. The central wire 1222 forms an inner wire that moves within the outer case 1226 relative to both the outer case 1226 and the radial protrusion 1224. The outer case 1226 may be provided over a majority of the central wire 1222 and the radial protrusion 1224. The outer case 1226 has a radially innermost surface 1226a that has art inner diameter or inner maximum transverse width that is larger than the outer diameter or outer maximum transverse width formed by the radial protrusion 1224.

Here, the construction of the outer case 1226 is the same as the prior embodiments. However, in this embodiment, the radial protrusion 1224 is non-movably disposed on the radially innermost surface 1226a of the outer case 1226. In this way, the radial protrusion 1224 reduces the amount of contact between the radially innermost surface 1226a of the outer case 1226 and a radial outermost surface 1222a of the central wire 1222, and provides a resin contact surface on the interior of the outer case 1226, The central wire 1222 is a metallic multi-strand wire that is identical to the prior embodiments. However, it will be apparent from this disclosure that the central wire 1222 can be a solid metallic strand or a different construction if needed and/or desired.

In this embodiment, the radial protrusion 1224 is a resin strand that is identical to the radial protrusion 24, as discussed above. The resin material for the radial protrusion 1224 can be a fluorocarbon polymer that is preferably selected from a group consisting of perfluoroalkoxy, fluoroethylene-propylene and polytetrafluoroethylene, or an olefin polymer that is selected from a group consisting of polyethylene and polyacetal, or a polyethylene terephthalate polymer.

Of course, it will be apparent from this disclosure that other variations can be made without departing from the invention. For example, the bicycle control cable 1212 can include, such as, applying a coating of grease over the central wire 1222 and the radial protrusion 1224, and/or having the individual strands of the radial protrusion 1224 can be coated with a solid lubricant that forms an outer shell over an inner core. The radial protrusion 1224 can be changed from a solid resin strand with a circular cross sectional shape to a non-circular cross sectional shape (i.e., a multi string configuration or a splined cross sectional shape). In other words, the radial protrusion 1224 can have any of the configurations of any of the other embodiments disclosed herein as needed and/or desired.

Figure 29:
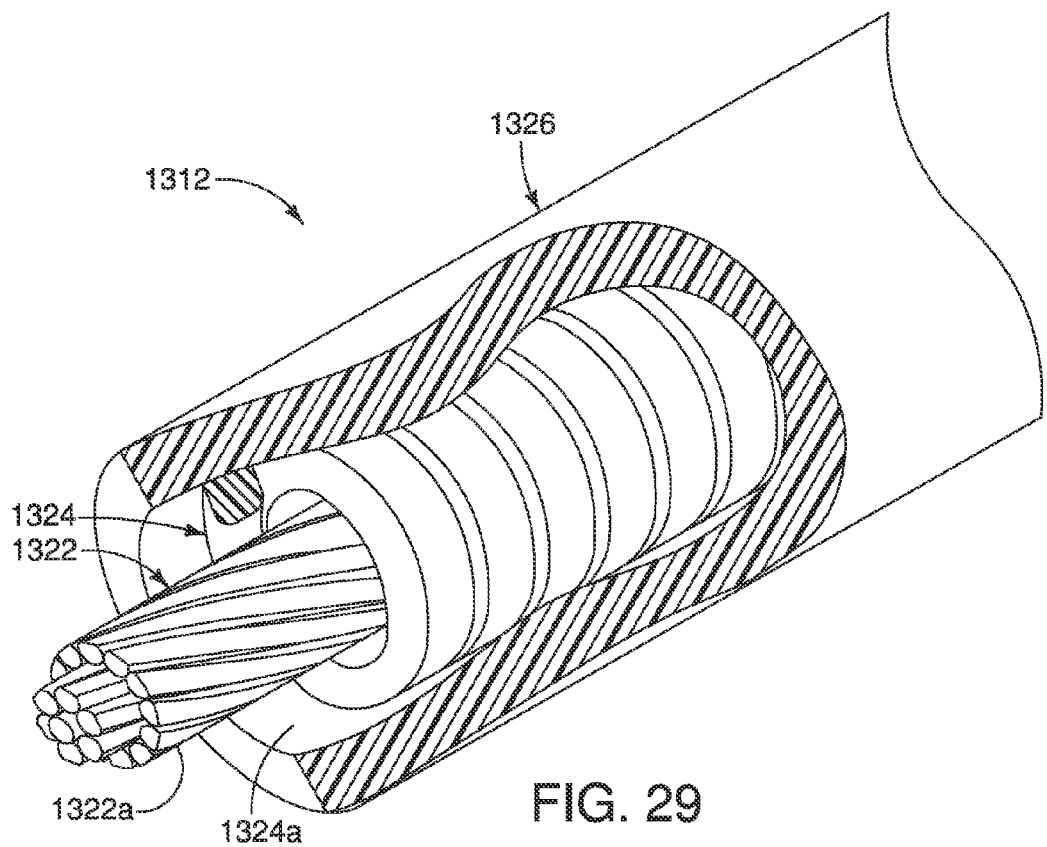
FIG. 29 is an enlarged perspective view of a portion of a bicycle control cable in accordance with a fourteenth embodiment with a portion of the outer case removed for purposes of illustration.
Figure 30:
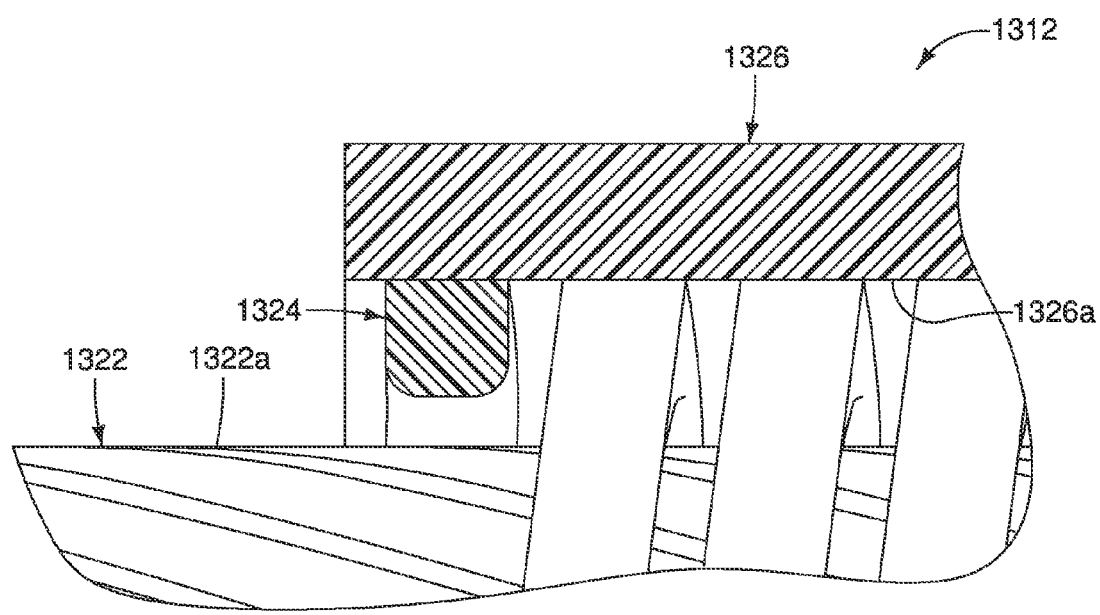
FIG. 30 is a further enlarged partial cross sectional view of a portion of the bicycle control cable illustrated in FIG. 29.

Referring now to FIGS. 29 and 30, a bicycle control cable 1312 will now be explained in accordance with a fourteenth embodiment. The bicycle control cable 1312 basically, includes a central wire 1322, a radial protrusion 1324 and an outer case 1326. The central wire 1322 forms an inner wire that moves within the outer case 1326 relative to both the outer case 1326 and the radial protrusion 1324. The outer case 1326 may be provided over a majority of the central wire 1322 and the radial protrusion 1324. The outer case 1326 has a radially innermost surface 1326*a* that has an inner diameter or inner maximum transverse width that is larger than the outer diameter or outer maximum transverse width formed by the radial protrusion 1324.

Here, the construction of the outer case 1326 is the same as the prior embodiments. However, in this embodiment like the thirteenth embodiment, the radial protrusion 1324 is non-movably disposed on the radially innermost surface 1326*a* of the outer case 1326. In this way, the radial protrusion 1324 reduces the amount of contact between the radially innermost surface 1326*a* of the outer case 1326 and a radial outermost surface 1322*a* of the central wire 1322, and provides a resin contact surface on the interior of the outer case 1326. The central wire 1322 is a metallic multi-strand wire that is identical to the prior embodiments. However, it will be apparent from this disclosure that the central wire 1322 can be a solid metallic strand or a different construction if needed and/or desired.

In this embodiment, the radial protrusion 1324 is a resin strand that is identical to the radial protrusion 24, as discussed above, except for the cross sectional shape has been changed. Thus, the bicycle control cable 1312 is identical to the bicycle control cable 12, as described above, except that the radial protrusion 1324 is non-movably disposed on a radially innermost surface 1326*a* of the outer case 1326 and the radial protrusion 1324 is non-circular in cross section instead of being circular in cross section and disposed on the central wire 1322. Of course, it will be apparent from this disclosure that other variations can be made without departing from the invention. For example, the bicycle control cable 1312 can include, such as, applying a coating of grease over the central wire 1322 and the radial protrusion 1324, and/or changing the configuration of the radial protrusion 1324 any of the other configurations disclosed herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired, except if specifically defined, Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control cable comprising:
a central wire including at least one metallic strand defining a radially most surface of the central wire;
an outer case surrounding at least a portion of an axial length of the central wire, the outer case having a radially innermost surface; and
a radial protrusion non-removably attached by thermal melting the radial protrusion directly on one of either the radially outermost surface of the central wire or the radially innermost surface of the outer case and spirally extending along the one of either the radially outermost surface of the central wire or the radially innermost surface of the outer case in a direction intersecting with a center longitudinal axis of the bicycle control cable such that the radial protrusion defines a spiral gap with the one of either the radially outermost surface of the central wire or the radially innermost surface of the outer case being exposed through the gap, the radial protrusion being in sliding contact with the other one of either the radially outermost surface of the central wire or the radially innermost surface of the outer case and reducing a sliding resistance of the central wire relative to the outer case,
the central wire being configured and arranged to slidably move in an axial direction with respect to the center longitudinal axis of the bicycle control cable within the outer case to operate a bicycle component.

2. The bicycle control cable according to claim 1, wherein the radial protrusion has a circular cross sectional shape that reduces a sliding resistance of the central wire relative to the outer case.

3. The bicycle control cable according to claim 2, wherein the radial protrusion is a resin strand having a plurality of strings twined about each other.

4. The bicycle control cable according to claim 2, wherein the radial protrusion is a resin strand.

5. The bicycle control cable according to claim wherein the radial protrusion is a helically wound resin strand having a pitch of is less than or equal to one millimeter.

6. The bicycle controlable according to claim 1, wherein the central wire includes a plurality of metal stands, and the radial protrusion is a resin strand having a diameter that is smaller than each of the metal strands of the central wire.

7. Tire bicycle control cable according to claim 6, wherein the resin strand has a diameter of about 80 micrometers, and the central wire has an overall diameter of about 1.1 millimeters.

8. The bicycle control cable according to claim 1, wherein the radial protrusion has a first section with a first pitch and a second section with a second pitch, the first and second pitches being different from each other.

9. The bicycle control cable according to claim 8, wherein the second pitch of the second section is larger than the first pitch of the first section.

10. The bicycle control cable according to claim 9, wherein
the first section is positioned at a curved section of the bicycle control cable, and wherein the second section is positioned at a straight section of the bicycle control cable, when the bicycle control cable is mounted to a bicycle frame.

11. The bicycle control cable according to claim 8, wherein
the radial protrusion is non-movably disposed on the radially outermost surface of the central wire to move with the central wire relative to the outer case.

12. The bicycle control cable according to claim 1, wherein
the radial protrusion includes a first strand extending spirally along the radially; outermost surface of the central wire, and a second strand extending spirally along the radially outermost surface of the central wire.

13. The bicycle control cable according to claim 12, wherein
the first strand has a different characteristic from the second strand.

14. The bicycle control cable according to claim 12, wherein
the first strand has a different overall diameter from the second strand.

15. The bicycle control cable according to claim 12, wherein
the first strand is formed of a different material from the second strand.

16. The bicycle control cable according to claim 1, wherein
the radial protrusion is non-movably disposed on the radially innermost surface of the outer case to move with the outer case.

17. The bicycle control cable according to claim 1, wherein
the radial protrusion is made of one of a fluorocarbon polymer, an olefin polymer and a polyethylene terephthalate polymer.

18. A bicycle control cable comprising:
a central wire including at least one metallic strand defining a radially outermost surface of the central wire;
an outer case surrounding at least a portion of a axial length of the central wire, outer case having a radially innermost surface; and
a radial protrusion non-movably disposed on the radially outermost surface of the central wire and spirally extending along the radially outermost surface of the central wire in a direction intersecting with a center longitudinal axis of the bicycle control cable, the radial protrusion being a strand having a circular cross sectional shape that moves with the central wire relative to the outer case and reduces a sliding resistance of the central wire relative to the outer case,
the central wire being configured and arranged to slidably move in an axial direction with respect to the center longitudinal axis of the bicycle control cable within the outer case to operate a bicycle component.

19. The bicycle control cable according to claim 18, wherein
the radial protrusion is attached direct to the radially outermost surface of the central wire by thermal melting.

20. The bicycle control cable according to claim 18, wherein
the radially outermost surface of the central wire is coated by a primer layer so that the adhesion between the radial protrusion and the radially outermost surface of the central wire is enhanced.

* * * * *